(12) United States Patent
Luo et al.

(10) Patent No.: US 11,575,420 B2
(45) Date of Patent: Feb. 7, 2023

(54) CHANNEL SOUNDING TECHNIQUES WITH ANALOG BEAMFORMING

(71) Applicant: QUALCOMM Incorporated, San Diego, CA (US)

(72) Inventors: Tao Luo, San Diego, CA (US); Wooseok Nam, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 17/115,126

(22) Filed: Dec. 8, 2020

(65) Prior Publication Data

US 2021/0175944 A1 Jun. 10, 2021

Related U.S. Application Data

(60) Provisional application No. 62/946,129, filed on Dec. 10, 2019.

(51) Int. Cl.
*H04B 7/06* (2006.01)
*H04W 72/12* (2009.01)
(Continued)

(52) U.S. Cl.
CPC ......... *H04B 7/0617* (2013.01); *H04B 7/0626* (2013.01); *H04L 5/0048* (2013.01);
(Continued)

(58) Field of Classification Search
CPC .. H04B 7/0413; H04B 7/0456; H04B 7/0617; H04B 7/0626; H04B 7/0639;
(Continued)

(56) References Cited

U.S. PATENT DOCUMENTS

2010/0080187 A1* 4/2010 Papasakellariou .... H04L 5/0094
370/329
2014/0349587 A1 11/2014 Frenger et al.
(Continued)

FOREIGN PATENT DOCUMENTS

WO WO-2017058286 A1 4/2017
WO WO-2018144844 A1 8/2018

OTHER PUBLICATIONS

International Search Report and Written Opinion—PCT/US2020/063966—ISA/EPO—dated Feb. 18, 2021.

*Primary Examiner* — Michael Thier
*Assistant Examiner* — Prince A Mensah
(74) *Attorney, Agent, or Firm* — QUALCOMM Incorporated

(57) ABSTRACT

Methods, systems, and devices for wireless communications are described for beamformed communications. In some aspects, when using beamformed communications, a first communications node and a second communications node may establish a beam pair link using a first beam. The first communications node may use a first set of beamforming weights at each antenna element of a set of antenna elements for transmissions of the first beam. After the beam pair is established, the first communications node may transmit multiple sounding signals using different subsets of the first set of antenna elements. A second communications node may measure the multiple sounding signals and use the measurements in scheduling one or more transmissions at the first communications node (e.g., to determine a modulation and coding scheme or coding rate), using one or more of the subsets of antenna elements.

28 Claims, 17 Drawing Sheets

(51) Int. Cl.
   *H04W 24/08* (2009.01)
   *H04W 24/10* (2009.01)
   *H04L 5/00* (2006.01)

(52) U.S. Cl.
   CPC ........... *H04W 24/08* (2013.01); *H04W 24/10* (2013.01); *H04W 72/12* (2013.01)

(58) Field of Classification Search
   CPC ... H04B 7/0689; H04L 5/0048; H04L 5/0051; H04L 5/0094; H04W 24/08; H04W 24/10; H04W 52/10; H04W 72/12; H04W 72/0473
   See application file for complete search history.

(56) References Cited

U.S. PATENT DOCUMENTS

| | | |
|---|---|---|
| 2018/0054251 A1 | 2/2018 | Alex |
| 2018/0212664 A1* | 7/2018 | Kim ..................... H04B 7/0639 |
| 2019/0149249 A1 | 5/2019 | Raghavan et al. |
| 2020/0404593 A1* | 12/2020 | Yao ....................... H04W 52/10 |
| 2021/0250206 A1* | 8/2021 | Liu ...................... H04B 7/0689 |
| 2021/0258057 A1* | 8/2021 | Kim .................. H04W 72/0473 |
| 2021/0367730 A1* | 11/2021 | Chen .................... H04L 5/0051 |
| 2022/0021420 A1* | 1/2022 | Liu ...................... H04B 7/0413 |
| 2022/0116087 A1* | 4/2022 | Österling ............. H04B 7/0617 |
| 2022/0167199 A1* | 5/2022 | Liu ...................... H04B 7/0456 |

\* cited by examiner

CHANNEL SOUNDING TECHNIQUES WITH ANALOG BEAMFORMING

CROSS REFERENCE

The present Application for Patent claims the benefit of U.S. Provisional Patent Application No. 62/946,129 by LUO et al., entitled "HIGHER RESOLUTION OF CHANNEL SOUNDING WITH ANALOG BEAMFORMING," filed Dec. 10, 2019, assigned to the assignee hereof, and expressly incorporated by reference herein.

FIELD OF TECHNOLOGY

The following relates generally to wireless communications and more specifically to channel sounding techniques with analog beamforming.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support beamforming operations for directional communications. Beamforming, which may also be referred to as spatial filtering, directional transmission, or directional reception, may be a signal processing technique that may be used at a transmitting device or a receiving device to select, shape, or steer an antenna beam (for example, a transmit directional beam, a receive directional beam) along a spatial path between the transmitting device and the receiving device. Some wireless communications systems may support beamforming operations to mitigate pathloss and blockages with respect to the spatial path. As demand for communication efficiency increases, it may be desirable for a wireless communications system to target low latencies and improve reliability using beamforming operations.

SUMMARY

The described techniques relate to improved methods, systems, devices, and apparatuses that support channel sounding with analog beamforming. In some aspects, techniques are provided for nodes in a wireless communications system to establish a beam pair link using a first beam, where a first communication node, such as a user equipment (UE), may use a first set of beamforming weights at each antenna element of a set of antenna elements for the first beam. In some cases, the first communication node may transmit multiple sounding signals using different subsets of the first set of antenna elements. A second communications node, such as a base station, may measure the multiple sounding signals and use the measurements in scheduling one or more transmissions at the first communications node (e.g., to determine a modulation and coding scheme or coding rate), using one of the subsets of antenna elements.

A method of wireless communication is described. The method may include determining, at a first communication node, a first beam for use in communicating with a second communication node, where the first beam is formed by applying beamforming weights to signals at each antenna element of a set of antenna elements at the first communication node, transmitting a first sounding signal to the second communication node using a first subset of the set of antenna elements and beamforming weights at each antenna element of the first subset of antenna elements that correspond to the beamforming weights of the first beam, and transmitting a second sounding signal to the second communication node using a second subset of the set of antenna elements and beamforming weights at each antenna element of the second subset of antenna elements that correspond to the beamforming weights of the first beam, and where the second subset of antenna elements is different than the first subset of antenna elements.

An apparatus for wireless communication is described. The apparatus may include a processor, memory coupled with the processor, and instructions stored in the memory. The instructions may be executable by the processor to cause the apparatus to determine, at a first communication node, a first beam for use in communicating with a second communication node, where the first beam is formed by applying beamforming weights to signals at each antenna element of a set of antenna elements at the first communication node, transmit a first sounding signal to the second communication node using a first subset of the set of antenna elements and beamforming weights at each antenna element of the first subset of antenna elements that correspond to the beamforming weights of the first beam, and transmit a second sounding signal to the second communication node using a second subset of the set of antenna elements and beamforming weights at each antenna element of the second subset of antenna elements that correspond to the beamforming weights of the first beam, and where the second subset of antenna elements is different than the first subset of antenna elements.

Another apparatus for wireless communication is described. The apparatus may include means for determining, at a first communication node, a first beam for use in communicating with a second communication node, where the first beam is formed by applying beamforming weights to signals at each antenna element of a set of antenna elements at the first communication node, transmitting a first sounding signal to the second communication node using a first subset of the set of antenna elements and beamforming weights at each antenna element of the first subset of antenna elements that correspond to the beamforming weights of the first beam, and transmitting a second sounding signal to the second communication node using a second subset of the set of antenna elements and beamforming weights at each antenna element of the second subset of antenna elements that correspond to the beamforming weights of the first beam, and where the second subset of antenna elements is different than the first subset of antenna elements.

A non-transitory computer-readable medium storing code for wireless communication is described. The code may include instructions executable by a processor to determine, at a first communication node, a first beam for use in communicating with a second communication node, where the first beam is formed by applying beamforming weights to signals at each antenna element of a set of antenna elements at the first communication node, transmit a first sounding signal to the second communication node using a first subset of the set of antenna elements and beamforming weights at each antenna element of the first subset of antenna elements that correspond to the beamforming weights of the first beam, and transmit a second sounding signal to the second communication node using a second subset of the set of antenna elements and beamforming weights at each antenna element of the second subset of antenna elements that correspond to the beamforming weights of the first beam, and where the second subset of antenna elements is different than the first subset of antenna elements.

In some examples of the method, apparatuses, and non-transitory computer-readable medium described herein, the transmitting the first sounding signal may include operations, features, means, or instructions for muting at least a first antenna element of the set of antenna elements while applying the beamforming weights to remaining antenna elements of the set of antenna elements to transmit the first sounding signal. In some examples of the method, apparatuses, and non-transitory computer-readable medium described herein, the transmitting the second sounding signal may include operations, features, means, or instructions for muting at least a second antenna element of the set of antenna elements while applying the beamforming weights to remaining antenna elements of the set of antenna elements, including the first antenna element, to transmit the first sounding signal.

In some examples of the method, apparatuses, and non-transitory computer-readable medium described herein, the beamforming weights of each unmuted antenna element used for transmitting the first sounding signal or the second sounding signal are unchanged from the beamforming weights of the first beam. In some examples of the method, apparatuses, and non-transitory computer-readable medium described herein, the beamforming weights of one or more unmuted antenna elements used for transmitting the first sounding signal or the second sounding signal may be power boosted or scaled relative to the beamforming weights of the first beam. In some examples of the method, apparatuses, and non-transitory computer-readable medium described herein, one or more of the first subset of antenna elements or the second subset of antenna elements contains a single antenna element.

Some examples of the method, apparatuses, and non-transitory computer-readable medium described herein may further include operations, features, means, or instructions for transmitting a capability indication to the second communication node that indicates the first communication node is capable of supporting transmissions using different subsets of the set of antenna elements. Some examples of the method, apparatuses, and non-transitory computer-readable medium described herein may further include operations, features, means, or instructions for receiving, from the second communication node, scheduling information for one or more transmissions to the second communication node that are to be transmitted or received using the first subset of antenna elements or the second subset of antenna elements, where the scheduling information is based on a channel state information measurement of the first sounding signal or the second sounding signal. Some examples of the method, apparatuses, and non-transitory computer-readable medium described herein may further include operations, features, means, or instructions for receiving, from the second communication node, channel information associated with one or more of the first sounding signal or the second sounding signal. In some examples of the method, apparatuses, and non-transitory computer-readable medium described herein, the channel information includes one or more of a beam and antenna subset index, a channel impulse response, beam angle information, beam delay spread information, a modulation order for subsequent communications using the associated subset of antenna elements, a precoding matrix indicator for subsequent communications using the associated subset of antenna elements, a rank indicator for subsequent communications using the associated subset of antenna elements, or any combinations thereof. In some examples of the method, apparatuses, and non-transitory computer-readable medium described herein, the beamforming weights are analog beamforming weights, and where each antenna element of the set of antenna elements is associated with a same digital processing chain at the first communication node.

In some examples of the method, apparatuses, and non-transitory computer-readable medium described herein, the determining the first beam may include operations, features, means, or instructions for measuring a set of reference signals transmitted by the second communication node using a set of different beams in a beam sweep procedure, and selecting the first beam based on the measuring. Some examples of the method, apparatuses, and non-transitory computer-readable medium described herein may further include operations, features, means, or instructions for reporting the selected first beam to the second communication node.

A method of wireless communication is described. The method may include determining, at a second communication node, a first receive beam for use in receiving communications from a first communication node via a first transmit beam of the first communication node, where the first receive beam has an associated first set of beamforming weights that are applied to each antenna element of a set of second communication node antenna elements, and where the first transmit beam of the first communication node is transmitted via a set of first communication node antenna elements, measuring a first sounding signal received from the first communication node using the first set of beamforming weights of the first receive beam, measuring a second sounding signal received from the first communication node using the first set of beamforming weights of the first receive beam, where the first communication node uses different subsets of first communication node antenna elements for each of the first sounding signal and the second sounding signal, transmitting scheduling information to the first communication node for communications with the second communication node using one of the subsets of first communication node antenna elements, and communicating with the first communication node using the first set of beamforming weights of the first receive beam.

An apparatus for wireless communication is described. The apparatus may include a processor, memory coupled with the processor, and instructions stored in the memory. The instructions may be executable by the processor to cause the apparatus to determine, at a second communication node, a first receive beam for use in receiving communications from a first communication node via a first transmit beam of the first communication node, where the first receive beam has an associated first set of beamforming weights that are applied to each antenna element of a set of second communication node antenna elements, and where the first transmit beam of the first communication node is transmitted via a set of first communication node antenna elements, measure a first sounding signal received from the first communication node using the first set of beamforming weights of the first receive beam, measure a second sounding signal received from the first communication node using the first set of beamforming weights of the first receive beam, where the first communication node uses different subsets of first communication node antenna elements for each of the first sounding signal and the second sounding signal, transmit scheduling information to the first communication node for an uplink transmission to the second communication node using one of the subsets of first communication node antenna elements, and receive the uplink transmission from the first communication node using the first set of beamforming weights of the first receive beam.

Another apparatus for wireless communication is described. The apparatus may include means for determining, at a second communication node, a first receive beam for use in receiving communications from a first communication node via a first transmit beam of the first communication node, where the first receive beam has an associated first set of beamforming weights that are applied to each antenna element of a set of second communication node antenna elements, and where the first transmit beam of the first communication node is transmitted via a set of first communication node antenna elements, measuring a first sounding signal received from the first communication node using the first set of beamforming weights of the first receive beam, measuring a second sounding signal received from the first communication node using the first set of beamforming weights of the first receive beam, where the first communication node uses different subsets of first communication node antenna elements for each of the first sounding signal and the second sounding signal, transmitting scheduling information to the first communication node for communications with the second communication node using one of the subsets of first communication node antenna elements, and communicating with the first communication node using the first set of beamforming weights of the first receive beam.

A non-transitory computer-readable medium storing code for wireless communication is described. The code may include instructions executable by a processor to determine, at a second communication node, a first receive beam for use in receiving communications from a first communication node via a first transmit beam of the first communication node, where the first receive beam has an associated first set of beamforming weights that are applied to each antenna element of a set of second communication node antenna elements, and where the first transmit beam of the first communication node is transmitted via a set of first communication node antenna elements, measure a first sounding signal received from the first communication node using the first set of beamforming weights of the first receive beam, measure a second sounding signal received from the first communication node using the first set of beamforming weights of the first receive beam, where the first communication node uses different subsets of first communication node antenna elements for each of the first sounding signal and the second sounding signal, transmit scheduling information to the first communication node for communications with the second communication node using one of the subsets of first communication node antenna elements, and communicate with the first communication node using the first set of beamforming weights of the first receive beam.

Some examples of the method, apparatuses, and non-transitory computer-readable medium described herein may further include operations, features, means, or instructions for calculating a first channel state information measurement for the first sounding signal and a second channel state information measurement for the second sounding signal, and where the scheduling information may be determined based on the first channel state information measurement or the second channel state information measurement.

In some examples of the method, apparatuses, and non-transitory computer-readable medium described herein, the beamforming weights of each of the different subsets of antenna elements used for transmitting the first sounding signal or the second sounding signal may be unchanged from the beamforming weights of the first transmit beam. In some examples of the method, apparatuses, and non-transitory computer-readable medium described herein, the beamforming weights of one or more antenna elements of the different subsets of antenna elements used for transmitting the first sounding signal or the second sounding signal may be power boosted or scaled relative to the beamforming weights of the first transmit beam.

Some examples of the method, apparatuses, and non-transitory computer-readable medium described herein may further include operations, features, means, or instructions for configuring the first communication node to transmit the first sounding signal and the second sounding signal using the different subsets of first communication node antenna elements.

Some examples of the method, apparatuses, and non-transitory computer-readable medium described herein may further include operations, features, means, or instructions for receiving, from the first communication node, a capability indication that the first communication node is capable of transmitting using the different subsets of first communication node antenna elements, and where the configuring is performed responsive to receiving the capability indication.

Some examples of the method, apparatuses, and non-transitory computer-readable medium described herein may further include operations, features, means, or instructions for transmitting, to the first communication node, channel information associated with one or more of the first sounding signal or the second sounding signal. In some examples of the method, apparatuses, and non-transitory computer-readable medium described herein, the channel information includes one or more of a beam and antenna subset index, a channel impulse response, beam angle information, beam delay spread information, a modulation order for subsequent communications using the associated subset of antenna elements, a precoding matrix indicator for subsequent communications using the associated subset of antenna elements, a rank indicator for subsequent communications using the associated subset of antenna elements, or any combinations thereof.

In some examples of the method, apparatuses, and non-transitory computer-readable medium described herein, the determining the first receive beam may include operations, features, means, or instructions for transmitting a set of reference signals to the first communication node using a set of different beams in a beam sweep procedure, receiving a measurement report from the first communication node that may be based on measurements of one or more of the set of reference signals, and determining a transmit/receive beam pair that includes the first receive beam based on the measurement report.

DETAILED DESCRIPTION

Figure 1:
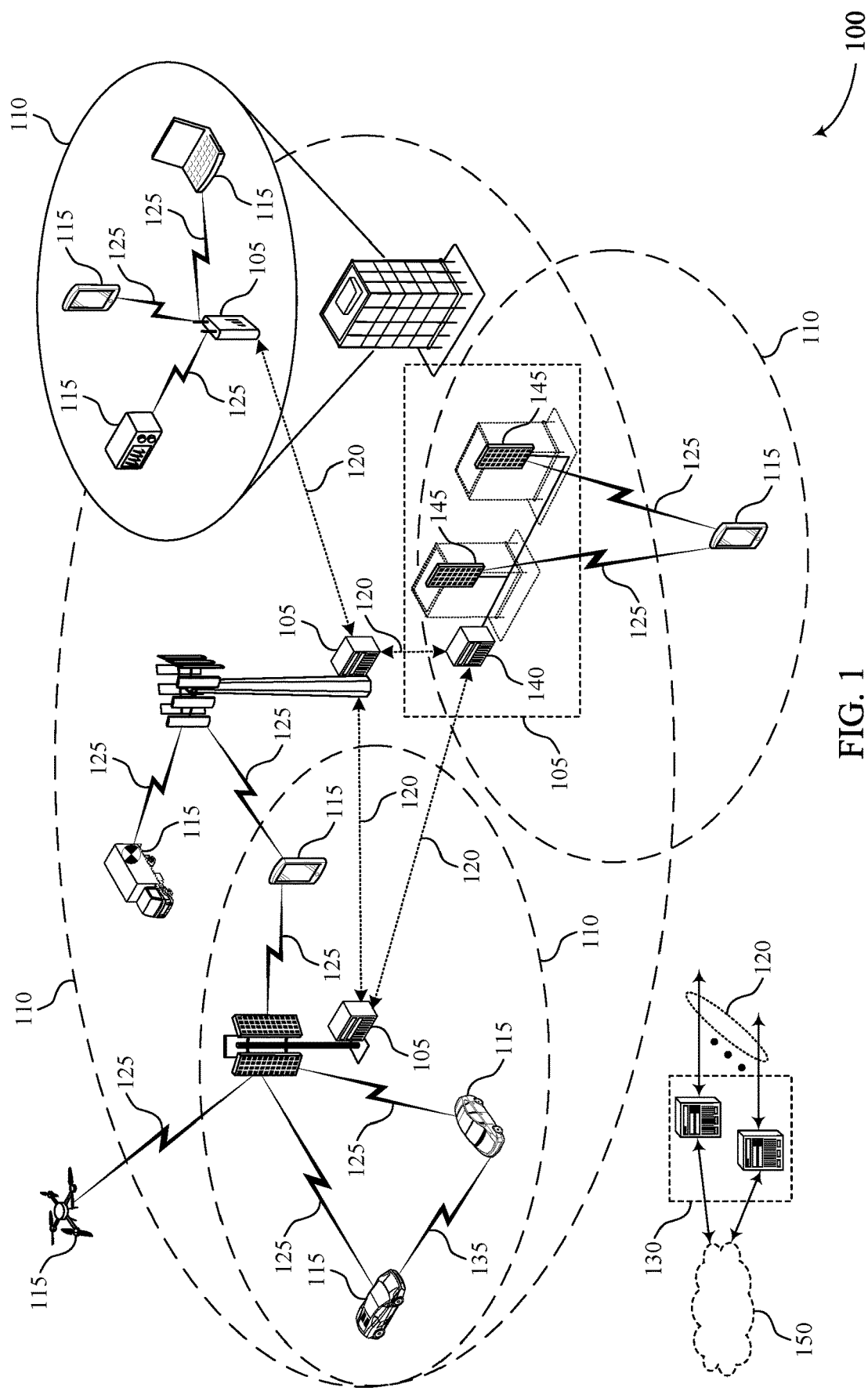
FIG. 1 illustrates an example of a system for wireless communications that supports channel sounding techniques with analog beamforming in accordance with aspects of the present disclosure.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz), with other operating bands under consideration such as FR4 (52.6 GHz-114.25 GHz). The frequencies between FR1 and FR2 are often referred to as mid-band frequencies. Although a portion of FR1 is greater than 6 GHz, FR1 may be referred to (interchangeably) as a "Sub-6 GHz" band. A similar nomenclature issue sometimes occurs with regard to FR2, which may be referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term millimeter wave (mmW) or the like if used herein may broadly represent frequencies that may include mid-band frequencies, may be within FR2 or FR4, or may be within the EHF band.

Some wireless communication systems may include communication devices, such as user equipment (UE) devices and base stations (e.g., next-generation NodeBs or giga-NodeBs (which may be referred to as gNBs)), that may support multiple radio access technologies. Examples of radio access technologies include 4G systems such as Long Term Evolution (LTE) systems and fifth generation (5G) systems which may be referred to as New Radio (NR) systems. Some wireless communications systems, such as multiple-input multiple output (MIMO) systems, may configure the communication devices to support mmW communications (also referred to as directional communications). In some examples, the communication devices may experience one or more of a pathloss or a blockage with respect to a spatial path for the mmW communications. As a result, the communication devices may support beamforming operations to counter one or more of the pathloss or the blockage, among other examples. However, such beamformed communications may be relatively power intensive, and thus power-saving techniques that may be used in such communications are desirable in order to reduce power consumption.

According to various aspects of the present disclosure, techniques are provided for transmitting beamformed communications by a communication node using one or more muted antenna elements. Such muted antenna elements may allow for a beamformed transmission to use less power relative to transmissions that use all antenna elements associated with an established beam. In some cases, in order to enhance reliability and decoding of such beamformed transmissions, the transmitting node may transmit one or more sounding signals using beamforming weights of the established beam with one or more antenna elements muted. A receiving node may measure the one or more sounding signals and determine one or more parameters for subsequent communications with the transmitting node.

For example, the receiving node may be a base station and the transmitting node may be a UE, and these nodes may establish a beam pair link (BPL) for beamformed communications. Such a BPL may include a transmit beam that may be used by the transmitting node, that is formed by applying a first set of beamforming weights to a first set of antenna elements. In some cases, a given digital chain can be cascaded with multiple antenna elements for transmission or reception purposes. Further, due to analog beamforming constraints, signals may be combined in the RF domain so that, at baseband, a receiving node (e.g., a UE or a base station) may also see combined signal from multiple antenna elements. Thus, the receiving node may not know the channel at individual antenna elements or different subsets of antenna elements, due to signaling combining at the RF domain. Various aspects of the present disclosure provide techniques for sounding channel(s) from a transmitting node to a receiving node, where the receiving node may convey such channel information to transmitting node for subsequent communications using one or more different subsets of antenna elements associated with an established beam. While various examples discussed herein describe a first communication node or a UE that transmits sounding signals using different subsets of antenna elements, it is to be understood that the disclosed techniques may also be used by a second communication node or base station to transmit multiple sounding signals for measurement at the first node or UE.

Particular aspects of the subject matter described in this disclosure may be implemented to realize one or more of the following potential advantages. The techniques employed by the described communication devices may provide benefits and enhancements to the operation of the communication devices. For example, operations performed by the described communication devices may provide improvements to power consumption when performing beam operations. In some examples, configuring the described communication devices to perform multiple transmissions of sounding signals using different subsets of antenna elements in which one or more antenna element is muted may support improvements to spectral efficiency, higher data rates, higher resolution of channel sounding, or combinations thereof. Various described techniques thus may promote higher reliability for beamforming operations, among other benefits. Further, the described techniques may allow communications at one or more communication devices using fewer than all of the antenna elements associated with an established beam, which can reduce power consumption at the communication devices.

Aspects of the disclosure are initially described in the context of wireless communications systems. Examples of sounding signal transmissions and process flows are then discussed. Aspects of the disclosure are further illustrated by and described with reference to apparatus diagrams, system diagrams, and flowcharts that relate to channel sounding with analog beamforming.

FIG. 1 illustrates an example of a wireless communications system 100 that supports channel sounding with analog beamforming in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating using one or more muted antenna elements, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some aspects, when using beamformed communications, a UE 115 and a base station 105 may establish a beam pair link using a first beam. For example, a UE 115 may use a first set of beamforming weights at each antenna element of a set of antenna elements for transmissions of the first beam. In some cases, after the beam pair is established, the UE 115 may transmit multiple sounding signals using different subsets of the set of antenna elements. A base station 105 may measure the multiple sounding signals and use the measurements in scheduling one or more transmissions at the UE (e.g., to determine a modulation and coding scheme or coding rate), using one or more of the subsets of antenna elements.

Figure 2:
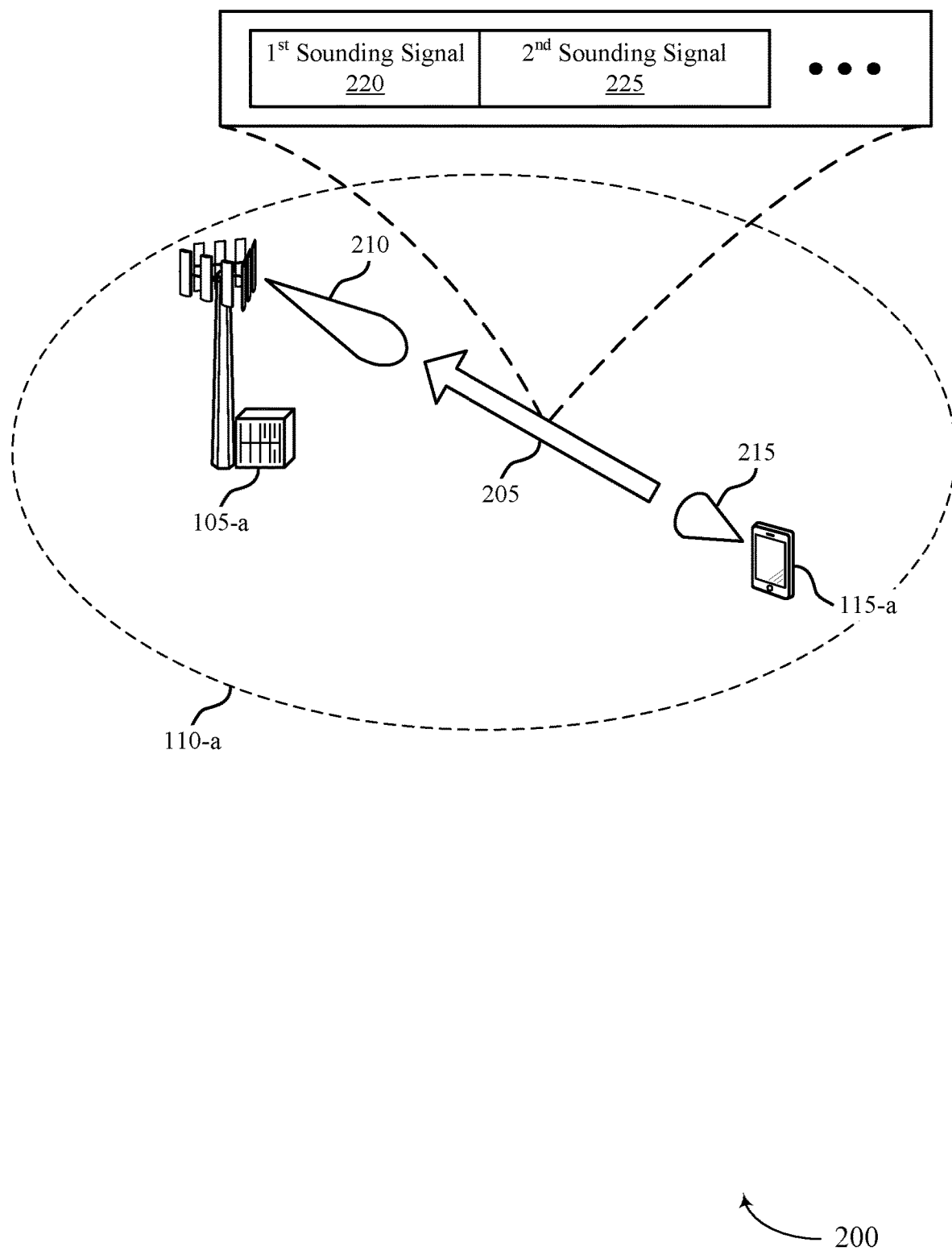
FIG. 2 illustrates an example of a portion of a wireless communications system that supports channel sounding techniques with analog beamforming in accordance with aspects of the present disclosure.

FIG. 2 illustrates an example of a wireless communications system 200 that supports channel sounding with analog beamforming in accordance with aspects of the present disclosure. In some examples, wireless communications system 200 may implement aspects of wireless communications system 100. In some examples, the wireless communications system 200 may include a UE 115-a and base station 105-a which may be examples of UEs 115 and base stations 105 described with reference to FIG. 1.

In this example, the UE 115-a and the base station 105-a may establish a BPL in which a base station beam 210 and a UE beam 215 may be determined based on a beam training procedure (e.g., P1/P2/P3 beam training procedures). For example, the base station 105-a and UE 115-a may use transmission and reception (Tx and Rx) analog beamforming codebooks, and may cycle through different elements of the codebooks and find good combinations of Tx and Rx beam pairs (e.g., through reference signal received power (RSRP) measurements, signal to interference and noise (SINR) measurements, and the like). The base station 105-a and UE 115-a may also exchange the beam information (e.g., through CSI and/or beam measurement reporting) to establish one or more BPLs. One, or more, of the beam pairs may be selected to be an active BPL. The UE 115-a may determine transmitter filtering (i.e., beamforming) weights (i.e., a combining weight for each antenna element) for an uplink sounding for the set of antenna elements used in the determined BPL.

In some cases, the UE 115-a may transmit using fewer than all of the antenna elements in the set of antenna elements, such as when power savings techniques are implemented. In such cases, the UE 115-a may transmit one or more sounding signals (e.g., sounding reference signals (SRSs)) in uplink transmissions 205, where each sounding signal uses a subset of the set of antenna elements. For example, given the transmitter filtering weights determined for the determined BPL, the UE 115-a may select a subset of antenna elements for transmitting a sounding signal to the base station 105-a. In some cases, the transmitter filtering weights for the selected subset of antenna elements may remain unchanged from the determined filtering weights, while other antenna elements from the set of antenna elements that are not in the subset are not used (i.e., muted) for transmission of the sounding signal. In some cases, the unchanged filtering weight may be a same weight as the determined filtering weight or where a relative change in the filtering weight is small or below a threshold difference. In some cases, the subset of antenna elements may contain only a single antenna element. The UE 115-a may cycle through different antenna subsets, may repeat the sounding signal transmission for one or more of the antenna subsets, or any combinations thereof.

Thus, in the example of FIG. 2, the UE 115-a may transmit a first sounding signal 220 using a first subset of antenna elements, and may transmit a second sounding signal 225 using a second subset of antenna elements that is different than the first subset of antenna elements. The base station 105-a may measure the first sounding signal 220 and the second sounding signal 225, as well as any other sounding signals (e.g., associated with one or more other subsets of antenna elements), using the same receive beam. In some cases, the base station 105-a may use the measurements for scheduling one or more uplink transmissions of the UE 115-a using one or more of the different subsets of antenna elements. For example, the base station 105-a may determine a MCS, coding rate, and the like, based on a particular subset of antenna elements that are to be used for the uplink transmission. In some cases, the base station 105-a may calculate channel state information (CSI) for the given beam and subset of antenna elements, and use such CSI for scheduling data transmissions for the UE 115-a. In some cases, the base station 105-a may also convey channel information to the UE 115-a. Such channel information may include a beam identification (e.g., TCI state or Tx filtering weights), one or more antenna subset indices, a channel impulse response, angle and/or delay spread information, modulation, precoding, and/or rank information, or any combinations thereof for a scheduled/configured data transmission.

Figure 3:
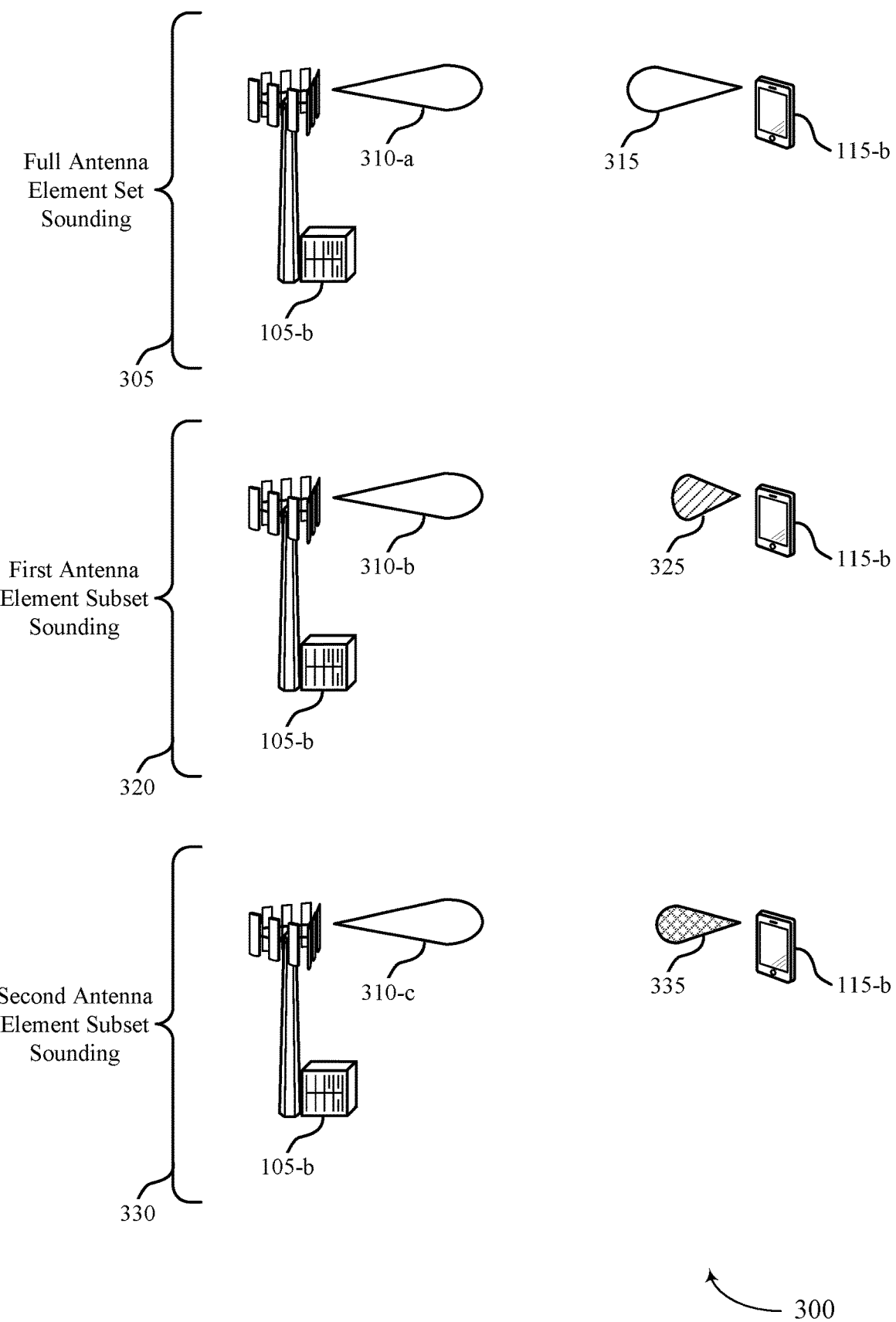
FIG. 3 illustrates an example of sounding signal transmissions that support channel sounding with analog beamforming in accordance with aspects of the present disclosure.

FIG. 3 illustrates an example of sounding signal transmissions 300 in analog beamforming in accordance with aspects of the present disclosure. In some examples, sounding signal transmissions 300 may implement aspects of wireless communications system 100 or 200. In this example, a base station 105-b and a UE 115-b may determine a BPL for communications (e.g., using an established beam training technique with a full antenna element set) that includes a base station beam 310-a and a first UE beam 315.

In the illustration of FIG. 3, a full antenna element set sounding 305 may be performed, in which the base station 105-b may use base station beam 310-a (e.g., a receive beam at the base station 105-b) to measure a sounding signal transmitted by the UE 115-b using the first UE beam 315 that uses the determined set of beamforming weights on the full set of antenna elements of the identified BPL.

A first antenna element subset sounding 320 may include the UE 115-a transmitting a second sounding signal using a subset of the antenna elements, which may result in a second UE beam 325, which may be different than the first UE beam 315 due to the changed antenna elements. For example, the second UE beam 325 may be a somewhat wider beam than the first UE beam 315. The base station 105-b may measure the second sounding signal using the base station beam 310-b. Similarly, a second antenna element subset sounding 330 may include the UE 115-a transmitting a third sounding signal using a different subset of the antenna elements, which may result in a third UE beam 335, which may be different than the first UE beam 315 and different than the second UE beam 325 due to the changed antenna elements.

The base station 105-*b* may measure the third sounding signal using the base station beam 310-*c*. The base station 105-*b* may determine, in some cases, one or more transmission parameters for the UE 115-*b* for use in an uplink or downlink transmission based at least in part on the measured sounding signals.

In some cases, the base station 105-*b* may provide an indication of the different antenna element subsets that are to be sounded by the UE 115-*b* (e.g., based on a subset index list that is provided to the UE 115-*b*). In some cases, the base station 105-*b* may determine that one or more subsets of antenna elements have more favorable channel conditions than other subsets of antenna elements, and may provide an indication of the more favorable subsets (e.g., through a subset index value that may be provided to the UE 115-*b*). In some cases, each of the base station beams 310-*a*, 310-*b*, and 310-*c* may use a same set of beamforming weights for receiving and measuring the different sounding signals.

Figure 4:
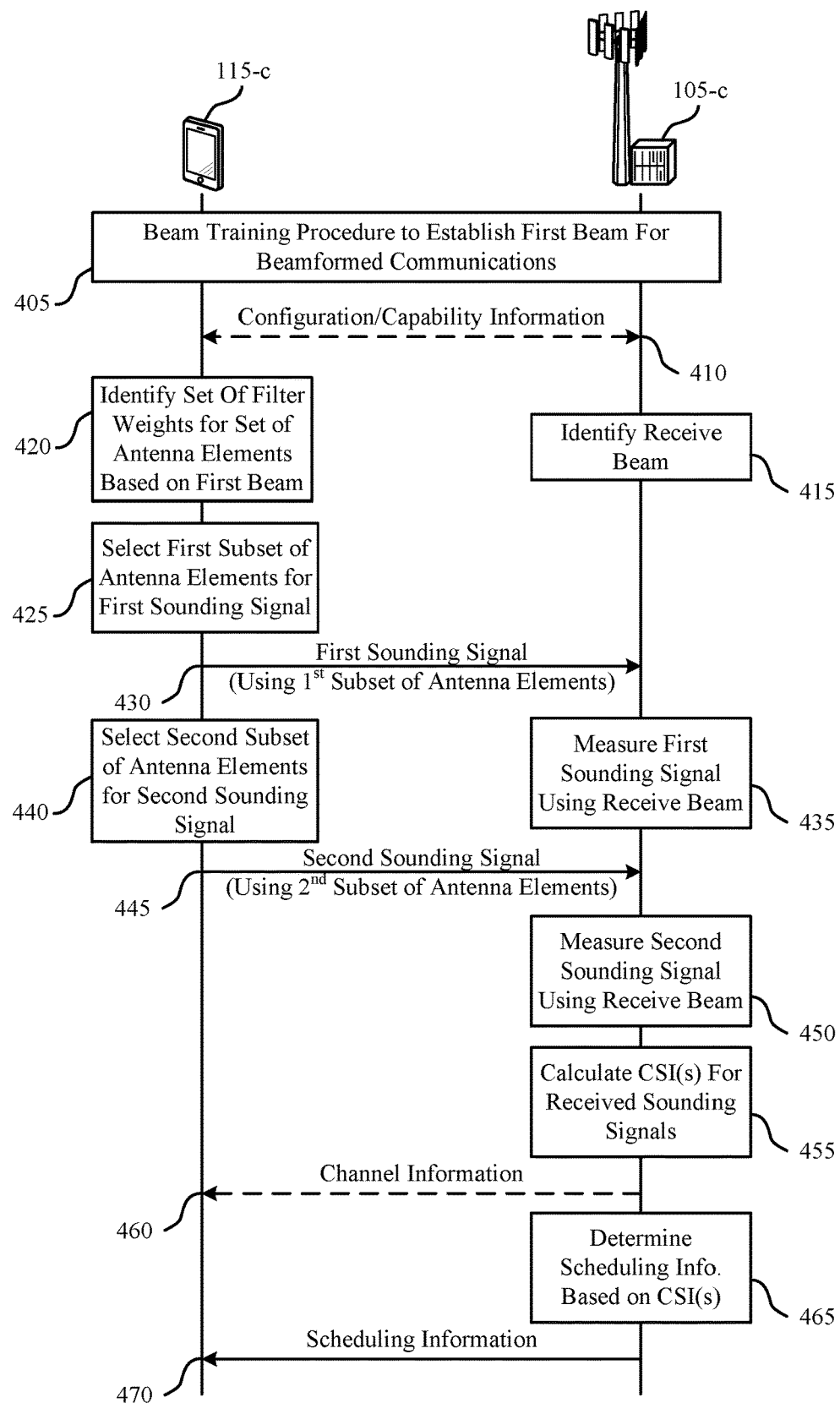
FIG. 4 illustrates an example of a process flow that supports channel sounding with analog beamforming in accordance with aspects of the present disclosure.

FIG. 4 illustrates an example of a process flow 400 that supports channel sounding with analog beamforming in accordance with aspects of the present disclosure. In some examples, process flow 400 may implement aspects of wireless communications system 100 or 200. For example, the process flow 400 may be based on a configuration by a base station 105 or a UE 115, and implemented for reduced power consumption, spectral efficiency, higher data rates and, in some examples, may promote high reliability and low latency for beamforming operations, among other benefits.

The process flow 400 may include a base station 105-*c*, which may be an example of a first communication node or a second communication node as discussed herein, and a UE 115-*c*, which may be an example of a first communication node or a second communication node as discussed herein. The base station 105-*c* and UE 115-*c* also may be examples of base stations 105 and UEs 115 as described with reference to FIGS. 1 through 3. In the following description of the process flow 400, the operations between the base station 105-*c* and the UE 115-*c* may be transmitted in a different order than the example order shown, or the operations performed by the base station 105-*c* and the UE 115-*c* may be performed in different orders or at different times. Some operations may also be omitted from the process flow 400, and other operations may be added to the process flow 400. Further, while this example illustrates the UE 115-*c* transmitting multiple sounding signals using different subsets of antenna elements, techniques such as discussed herein may be used in cases where other devices, such as base station 105-*c*, may transmit multiple sounding signals for measurement.

At 405, the UE 115-*c* and base station 105-*c* may perform a beam training procedure (e.g., a P1/P2/P3 procedure) to establish a first beam at the UE 115-*c* for transmission of beamformed communications in a BPL. The first beam may have an associated set of beamforming weights for a set of antenna elements at the UE 115-*c*.

Optionally, at 410, the base station 105-*c* and UE 115-*c* may exchange configuration information, capability information, or any combinations thereof. The configuration information may include, for example, a list of antenna subset indices for which the UE 115-*c* is to transmit sounding signals. In some cases, each index value of the list of antenna subset indices may be mapped to a particular subset of antenna elements at the UE 115-*c*. In some cases, the list of antenna subset indices may provide an order in which the sounding signals of each of the subsets is to be transmitted, which may be used to identify which subset of antenna elements is associated with a particular measurement at the base station 105-*c*. In some cases, the UE 115-*c* may transmit a capability indication to the base station 105-*c* to indicate whether the UE 115-*c* supports transmission of sounding signals for different subsets of antenna elements. In some cases, the configuration information, capability indication, or both, may be transmitted via RRC signaling. In other cases, the base station 105-*c* may provide the configuration information in broadcast signaling, such as in a remaining minimum system information (RMSI) transmission, a system information block (SIB) transmission, or in some other broadcast signaling.

At 415, the base station 105-*c* may identify a receive beam that is to be used for communications with the UE 115-*c*. The receive beam may be, for example, a receive beam of the established BPL. At 420, the UE 115-*c* may identify a set of filter weights for a set of antenna elements based on the established first beam. Such filter weights may be, for example, analog beamforming weights that are to be applied to a set of antenna elements at the UE 115-*c* for a sounding signal transmission that uses each antenna element of the set of antenna elements of the established first beam.

At 425, the UE 115-*c* may select a first subset of antenna elements for a first sounding signal transmission. In some cases, the UE 115-*c* may select the first subset of antenna elements based on configuration information provided by the base station 105-*c*. In some cases, the UE 115-*c* may select the first subset of antenna elements based on a prespecified first subset. In other cases, the first subset of antenna elements based on current channel conditions and a number of antenna elements that may be muted based on the current channel conditions. At 430, the UE 115-*c* may transmit the first sounding signal using the first subset of antenna elements. At 435, the base station 105-*c* may measure the first sounding signal using the identified receive beam (e.g., to determine CSI associated with the UE transmit beam).

At 440, the UE 115-*c* may select a second subset of antenna elements for a second sounding signal transmission. Similarly as discussed above, in some cases, the UE 115-*c* may select the second subset of antenna elements based on configuration information provided by the base station 105-*c*, based on a prespecified second subset, based on current channel conditions, or any combinations thereof. At 445, the UE 115-*c* may transmit the second sounding signal using the second subset of antenna elements. At 450, the base station 105-*c* may measure the second sounding signal using the identified receive beam (e.g., to determine CSI associated with the UE transmit beam).

At 455, the base station 105-*c* may calculate CSI(s) for the received sounding signals. Optionally, at 460, the base station 105-*c* may transmit channel information based on the measurements to the UE 115-*c*. At 465, the base station 105-*c* may determine scheduling information for the UE 115-*c* based on the CSI(s). For example, the base station 105-*c* may determine one or more of a modulation order, coding rate, precoding index, rank information, or any combinations thereof, for a for scheduled or configured data transmission of the UE 115-*c*. At 470, the base station 105-*c* may transmit the scheduling information to the UE 115-*c*.

Figure 5:
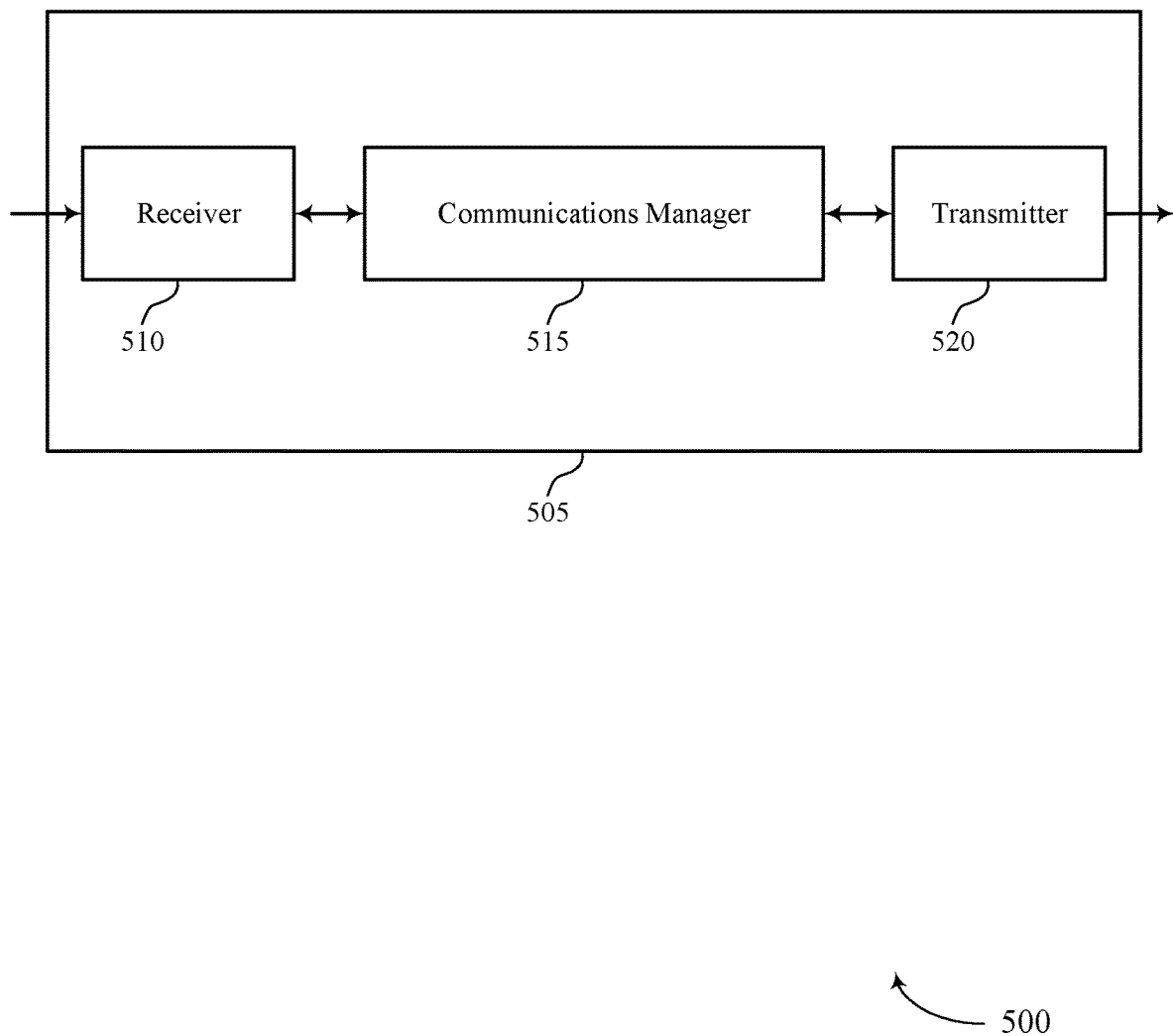
FIGS. 5 and 6 show block diagrams of devices that support channel sounding techniques with analog beamforming in accordance with aspects of the present disclosure.

FIG. 5 shows a block diagram 500 of a device 505 that supports channel sounding techniques with analog beamforming in accordance with aspects of the present disclosure. The device 505 may be an example of aspects of a UE 115, a first communication node, or a second communication node, as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to higher resolution of channel sounding with analog beamforming, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may determine, when the device 505 is acting as a first communication node, a first beam for use in communicating with a second communication node, where the first beam is formed by applying beamforming weights to signals at each antenna element of a set of antenna elements at the first communication node, transmit a first sounding signal to the second communication node using a first subset of the set of antenna elements and beamforming weights at each antenna element of the first subset of antenna elements that correspond to the beamforming weights of the first beam, and transmit a second sounding signal to the second communication node using a second subset of the set of antenna elements and beamforming weights at each antenna element of the second subset of antenna elements that correspond to the beamforming weights of the first beam, and where the second subset of antenna elements is different than the first subset of antenna elements. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
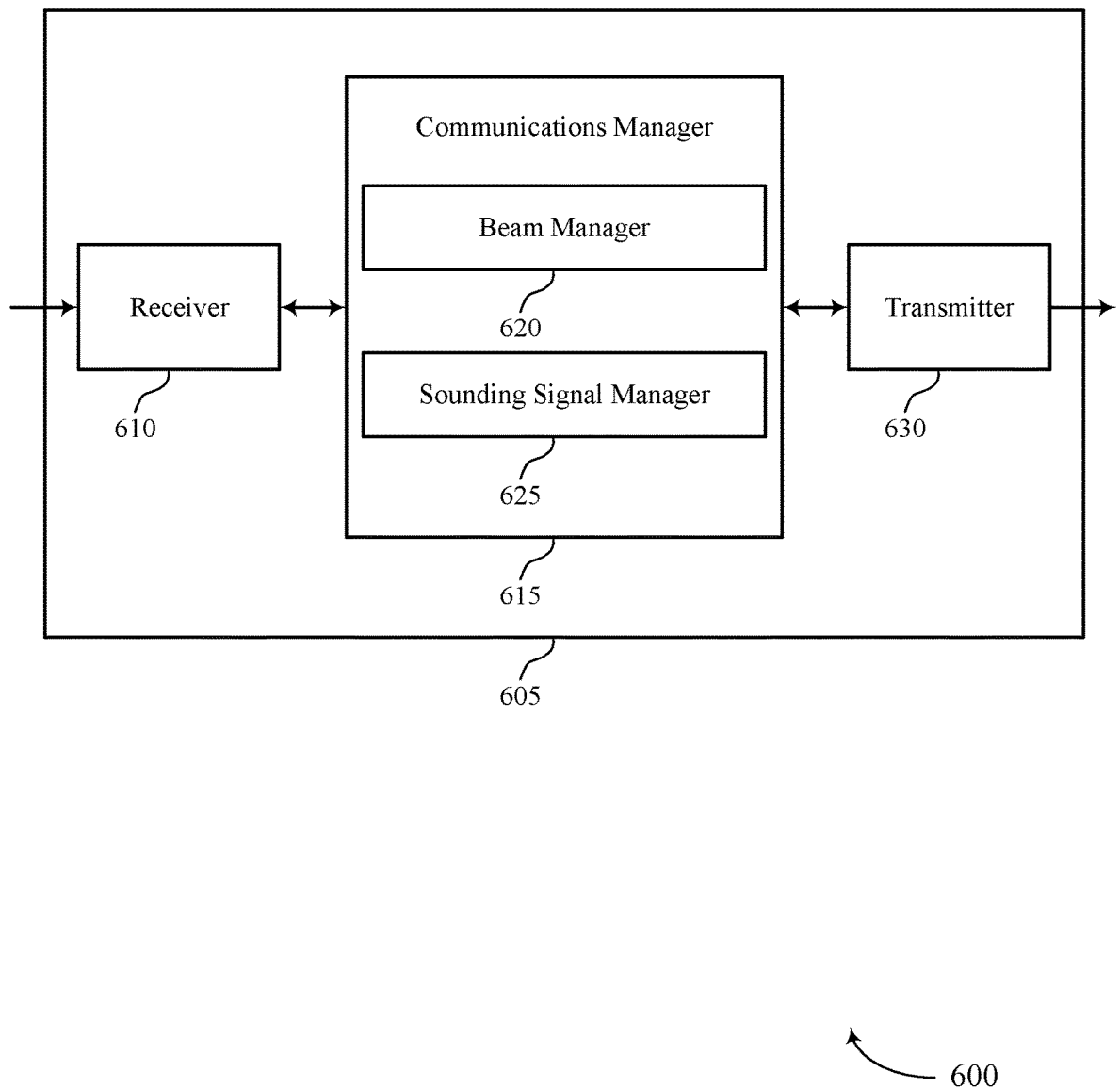

FIG. 6 shows a block diagram 600 of a device 605 that supports channel sounding techniques with analog beamforming in accordance with aspects of the present disclosure. The device 605 may be an example of aspects of a device 505, a UE 115, a first communication node, or a second communication node, as described herein. The device 605 may include a receiver 610, a communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to higher resolution of channel sounding with analog beamforming, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a beam manager 620 and a sounding signal manager 625. The communications manager 615 may be an example of aspects of the communications manager 810 described herein.

The beam manager 620 may determine, when the device 605 is acting as a first communication node, a first beam for use in communicating with a second communication node, where the first beam is formed by applying beamforming weights to signals at each antenna element of a set of antenna elements at the first communication node.

The sounding signal manager 625 may transmit a first sounding signal to the second communication node using a first subset of the set of antenna elements and beamforming weights at each antenna element of the first subset of antenna elements that correspond to the beamforming weights of the first beam and transmit a second sounding signal to the second communication node using a second subset of the set of antenna elements and beamforming weights at each antenna element of the second subset of antenna elements that correspond to the beamforming weights of the first beam, and where the second subset of antenna elements is different than the first subset of antenna elements.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
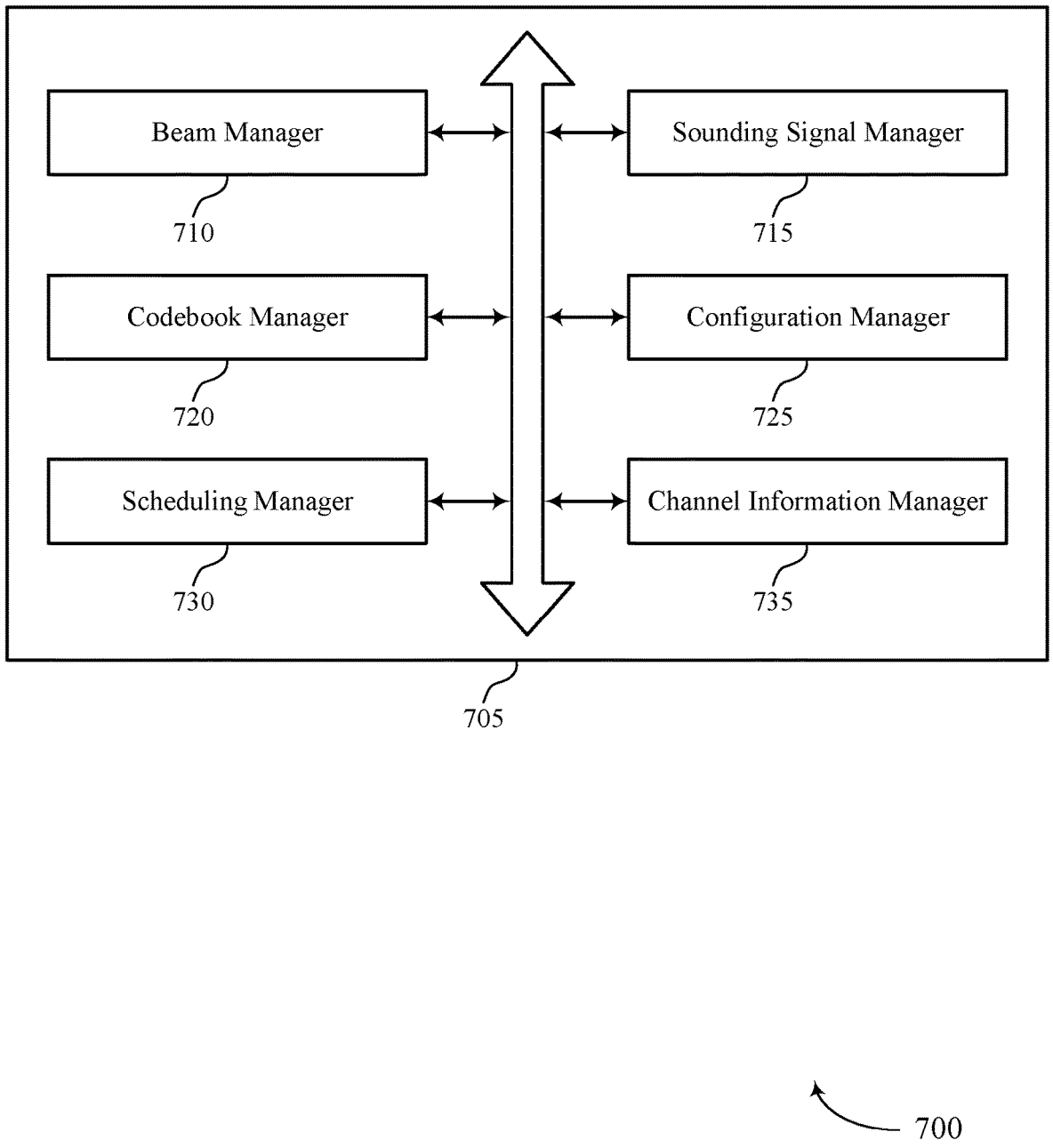
FIG. 7 shows a block diagram of a communications manager that supports channel sounding techniques with analog beamforming in accordance with aspects of the present disclosure.

FIG. 7 shows a block diagram 700 of a communications manager 705 that supports channel sounding techniques with analog beamforming in accordance with aspects of the present disclosure. The communications manager 705 may be an example of aspects of a communications manager 515, a communications manager 615, or a communications manager 810 described herein. The communications manager 705 may include a beam manager 710, a sounding signal manager 715, a codebook manager 720, a configuration manager 725, a scheduling manager 730, and a channel information manager 735. Each of these modules may communicate, directly or indirectly, with one another (e.g., via one or more buses).

The beam manager 710 may determine, when the communications manager 705 is associated with a first communication node, a first beam for use in communicating with a second communication node, where the first beam is formed by applying beamforming weights to signals at each antenna element of a set of antenna elements at the first communication node. In some examples, the beam manager 710 may measure a set of reference signals transmitted by the second communication node using a set of different beams in a beam sweep procedure. In some examples, the beam manager 710 may select the first beam based on the measuring.

The sounding signal manager 715 may transmit a first sounding signal to the second communication node using a first subset of the set of antenna elements and beamforming weights at each antenna element of the first subset of antenna elements that correspond to the beamforming weights of the first beam. In some examples, the sounding signal manager 715 may transmit a second sounding signal to the second communication node using a second subset of the set of antenna elements and beamforming weights at each antenna element of the second subset of antenna elements that correspond to the beamforming weights of the first beam, and where the second subset of antenna elements is different than the first subset of antenna elements.

In some examples, the sounding signal manager 715 may mute at least a first antenna element of the set of antenna elements while applying the beamforming weights to remaining antenna elements of the set of antenna elements to transmit the first sounding signal. In some examples, the sounding signal manager 715 may mute at least a second antenna element of the set of antenna elements while applying the beamforming weights to remaining antenna elements of the set of antenna elements, including the first antenna element, to transmit the first sounding signal. In some cases, one or more of the first subset of antenna elements or the second subset of antenna elements contains a single antenna element.

The codebook manager 720 may manage codebooks of beamforming weights for beamformed communications. In some cases, the beamforming weights of each unmuted antenna element used for transmitting the first sounding signal or the second sounding signal is unchanged from the beamforming weights of the first beam. In some cases, the beamforming weights of one or more unmuted antenna elements used for transmitting the first sounding signal or the second sounding signal is power boosted or scaled relative to the beamforming weights of the first beam. In some cases, the beamforming weights are analog beamforming weights, and where each antenna element of the set of antenna elements is associated with a same digital processing chain at the first communication node.

The configuration manager 725 may transmit a capability indication to the second communication node that indicates the first communication node is capable of supporting transmissions using different subsets of the set of antenna elements.

The scheduling manager 730 may receive, from the second communication node, scheduling information for one or more transmissions to or from the second communication node that are to be transmitted or received using the first subset of antenna elements or the second subset of antenna elements, where the scheduling information is based on a channel state information measurement of the first sounding signal or the second sounding signal.

The channel information manager 735 may receive, from the second communication node, channel information associated with one or more of the first sounding signal or the second sounding signal. In some cases, the channel information includes one or more of a beam and antenna subset index, a channel impulse response, beam angle information, beam delay spread information, a modulation order for subsequent communications using the associated subset of antenna elements, a precoding matrix indicator for subsequent communications using the associated subset of antenna elements, a rank indicator for subsequent communications using the associated subset of antenna elements, or any combinations thereof.

Figure 8:
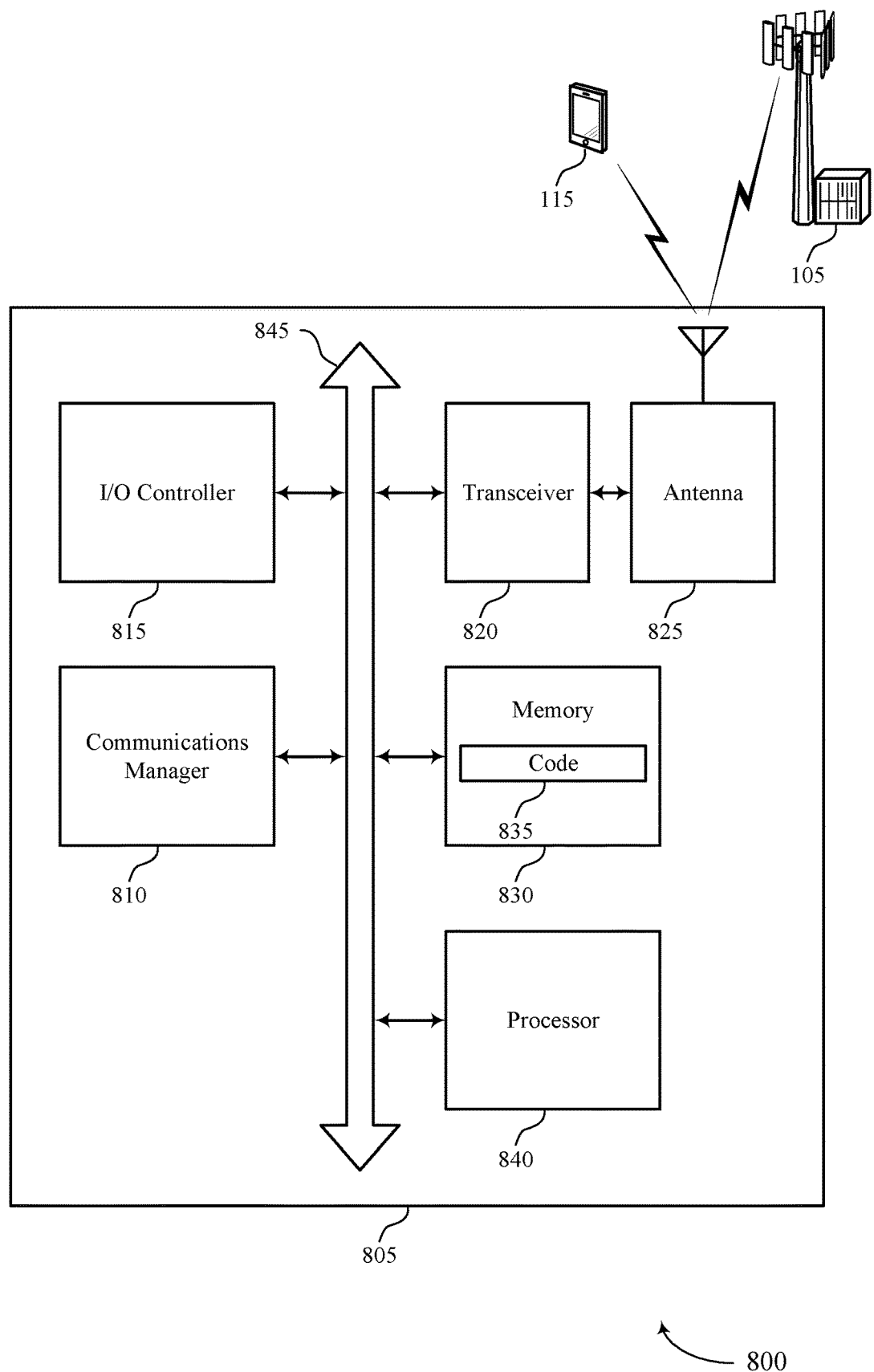
FIG. 8 shows a diagram of a system including a device that supports channel sounding techniques with analog beamforming in accordance with aspects of the present disclosure.

FIG. 8 shows a diagram of a system 800 including a device 805 that supports channel sounding techniques with analog beamforming in accordance with aspects of the present disclosure. The device 805 may be an example of or include the components of device 505, device 605, a UE 115, a first communication node, or a second communication node, as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may determine, when the device 805 is acting as a first communication node, a first beam for use in communicating with a second communication node, where the first beam is formed by applying beamforming weights to signals at each antenna element of a set of antenna elements at the first communication node, transmit a first sounding signal to the second communication node using a first subset of the set of antenna elements and beamforming weights at each antenna element of the first subset of antenna elements that correspond to the beamforming weights of the first beam, and transmit a second sounding signal to the second communication node using a second subset of the set of antenna elements and beamforming weights at each antenna element of the second subset of antenna elements that correspond to the beamforming weights of the first beam, and where the second subset of antenna elements is different than the first subset of antenna elements.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting higher resolution of channel sounding with analog beamforming).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
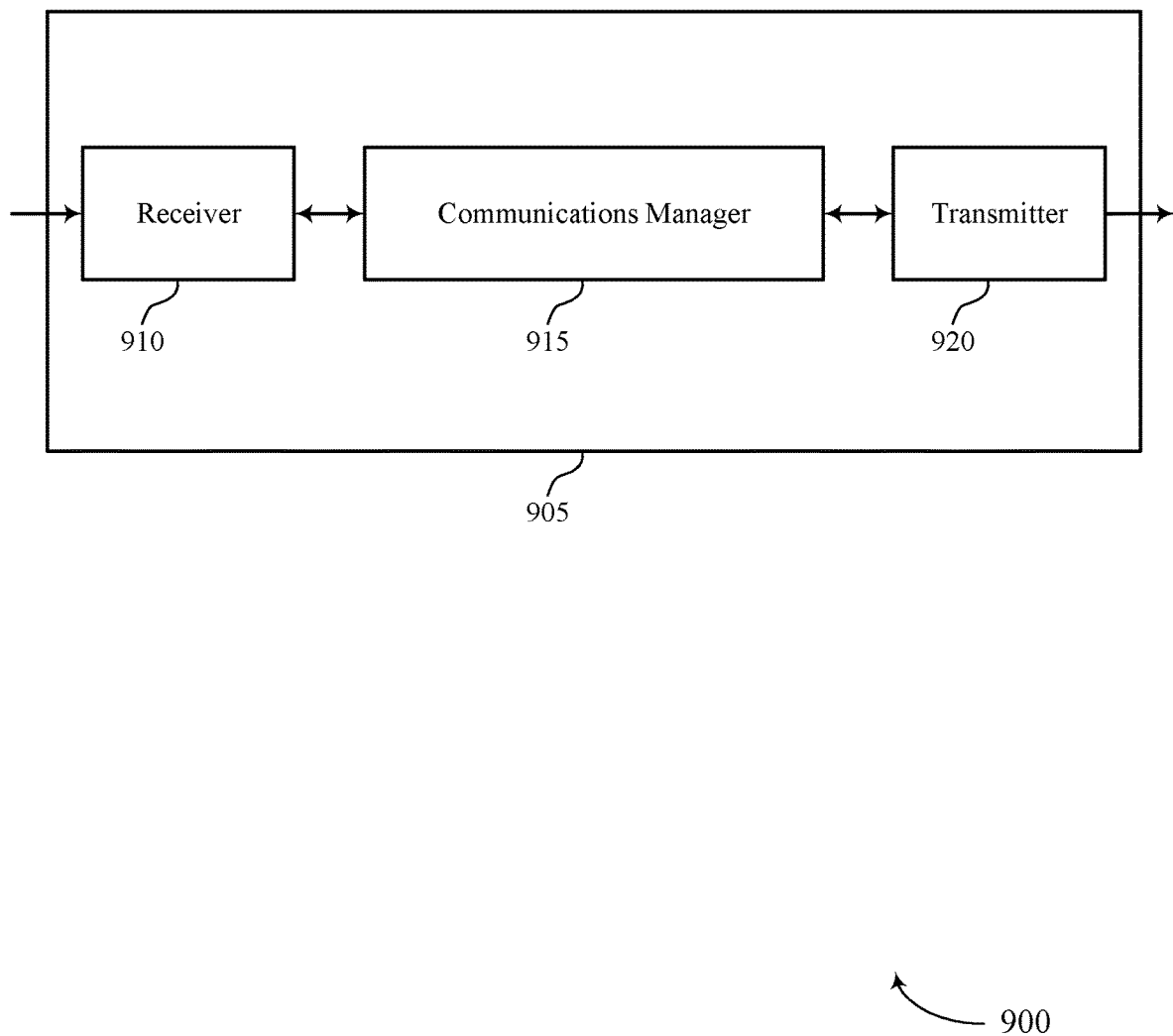
FIGS. 9 and 10 show block diagrams of devices that support channel sounding techniques with analog beamforming in accordance with aspects of the present disclosure.

FIG. 9 shows a block diagram 900 of a device 905 that supports channel sounding techniques with analog beamforming in accordance with aspects of the present disclosure. The device 905 may be an example of aspects of a base station 105, a first communication node, or a second communication node, as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to higher resolution of channel sounding with analog beamforming, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine, when the device 905 is acting as a second communication node, a first receive beam for use in receiving communications from a first communication node via a first transmit beam of the first communication node, where the first receive beam has an associated first set of beamforming weights that are applied to each antenna element of a set of second communication node antenna elements, and where the first transmit beam of the first communication node is transmitted via a set of first communication node antenna elements, communicate with the first communication node using the first set of beamforming weights of the first receive beam, measure a first sounding signal received from the first communication node using the first set of beamforming weights of the first receive beam, measure a second sounding signal received from the first communication node using the first set of beamforming weights of the first receive beam, where the first communication node uses different subsets of first communication node antenna elements for each of the first sounding signal and the second sounding signal, and transmit scheduling information to the first communication node for communications with the second communication node using one of the subsets of first communication node antenna elements. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
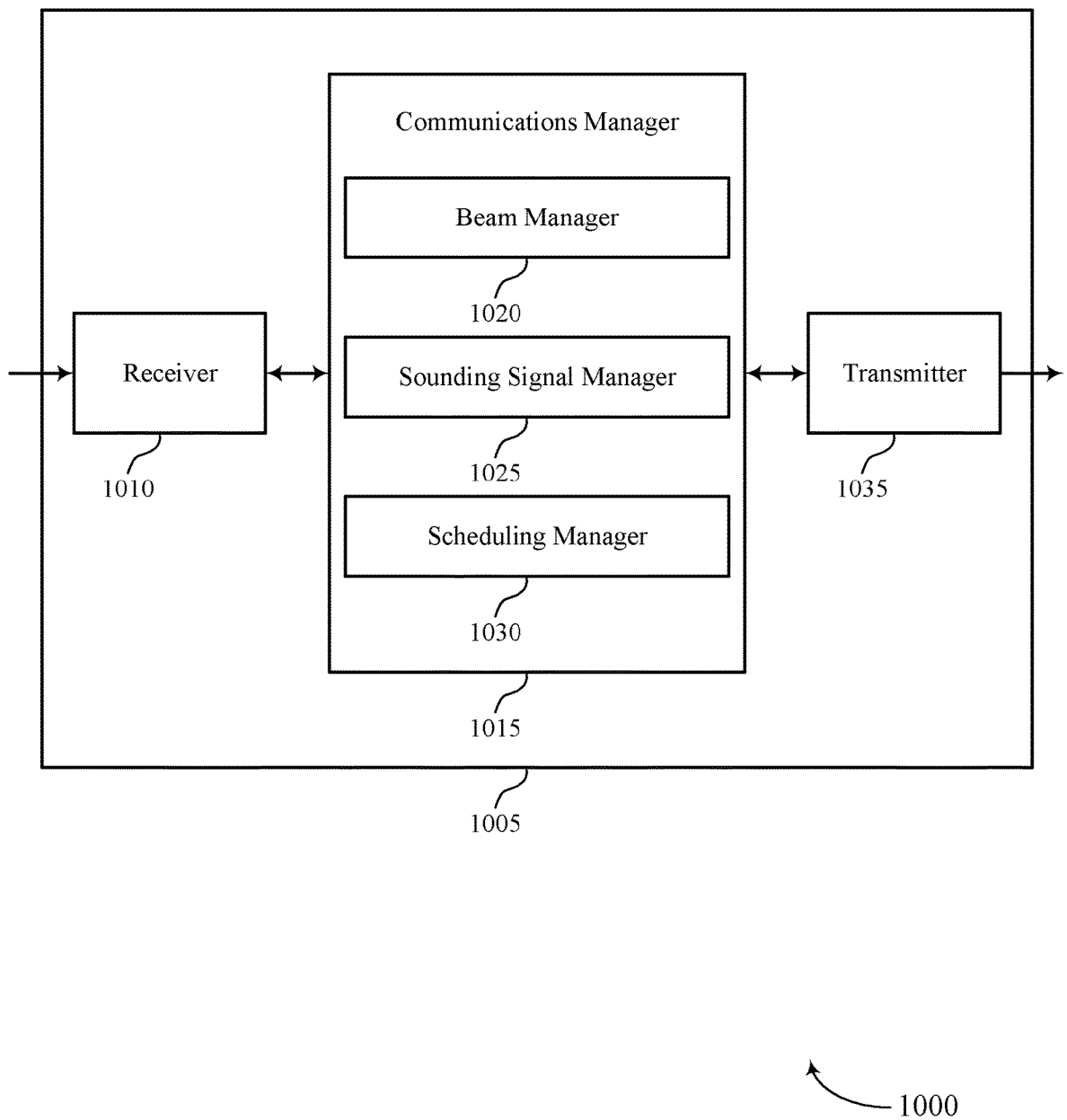

FIG. 10 shows a block diagram 1000 of a device 1005 that supports channel sounding techniques with analog beamforming in accordance with aspects of the present disclosure. The device 1005 may be an example of aspects of a device 905, a base station 105, a first communication node, or a second communication node, as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to higher resolution of channel sounding with analog beamforming, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a beam manager 1020, a sounding signal manager 1025, and a scheduling manager 1030. The communications manager 1015 may be an example of aspects of the communications manager 1210 described herein.

The beam manager 1020 may determine, when the device 1005 is acting as a second communication node, a first receive beam for use in receiving communications from a first communication node via a first transmit beam of the first communication node, where the first receive beam has an associated first set of beamforming weights that are applied to each antenna element of a set of second communication node antenna elements, and where the first transmit beam of the first communication node is transmitted via a set of first communication node antenna elements and communicate with the first communication node using the first set of beamforming weights of the first receive beam.

The sounding signal manager 1025 may measure a first sounding signal received from the first communication node using the first set of beamforming weights of the first receive beam and measure a second sounding signal received from the first communication node using the first set of beamforming weights of the first receive beam, where the first communication node uses different subsets of first communication node antenna elements for each of the first sounding signal and the second sounding signal.

The scheduling manager 1030 may transmit scheduling information to the first communication node for communications with the second communication node using one of the subsets of first communication node antenna elements.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
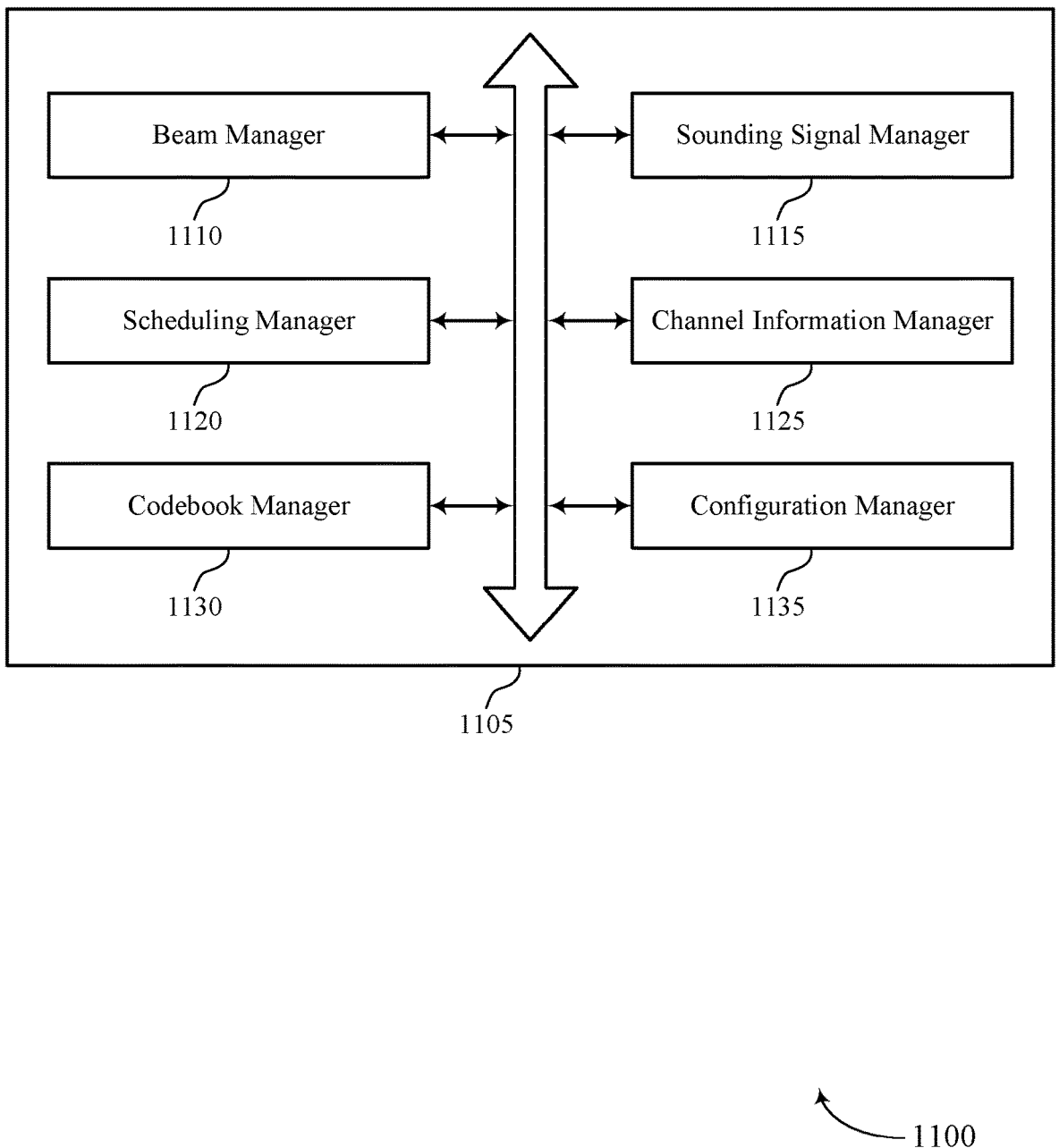
FIG. 11 shows a block diagram of a communications manager that supports channel sounding techniques with analog beamforming in accordance with aspects of the present disclosure.

FIG. 11 shows a block diagram 1100 of a communications manager 1105 that supports channel sounding techniques with analog beamforming in accordance with aspects of the present disclosure. The communications manager 1105 may be an example of aspects of a communications manager 915, a communications manager 1015, or a communications manager 1210 described herein. The communications manager 1105 may include a beam manager 1110, a sounding signal manager 1115, a scheduling manager 1120, a channel information manager 1125, a codebook manager 1130, and a configuration manager 1135. Each of these modules may communicate, directly or indirectly, with one another (e.g., via one or more buses).

The beam manager 1110 may determine, when the communications manager 1105 is associated with a second communication node, a first receive beam for use in receiving communications from a first communication node via a first transmit beam of the first communication node, where the first receive beam has an associated first set of beamforming weights that are applied to each antenna element of a set of second communication node antenna elements, and where the first transmit beam of the first communication node is transmitted via a set of first communication node antenna elements.

In some examples, the beam manager 1110 may communicate with the first communication node using the first set of beamforming weights of the first receive beam. In some examples, the beam manager 1110 may transmit a set of reference signals to the first communication node using a set of different beams in a beam sweep procedure. In some examples, the beam manager 1110 may receive a measurement report from the first communication node that is based on measurements of one or more of the set of reference signals. In some examples, the beam manager 1110 may determine a transmit/receive beam pair that includes the first receive beam based on the measurement report.

The sounding signal manager 1115 may measure a first sounding signal received from the first communication node using the first set of beamforming weights of the first receive beam. In some examples, the sounding signal manager 1115 may measure a second sounding signal received from the first communication node using the first set of beamforming weights of the first receive beam, where the first communication node uses different subsets of first communication node antenna elements for each of the first sounding signal and the second sounding signal.

The scheduling manager 1120 may transmit scheduling information to the first communication node for communications with the second communication node using one of the subsets of first communication node antenna elements.

The channel information manager 1125 may calculate a first channel state information measurement for the first sounding signal and a second channel state information measurement for the second sounding signal, and where the scheduling information is determined based on the first channel state information measurement or the second channel state information measurement. In some examples, the channel information manager 1125 may transmit, to the first communication node, channel information associated with one or more of the first sounding signal or the second sounding signal. In some cases, the channel information includes one or more of a beam and antenna subset index, a channel impulse response, beam angle information, beam delay spread information, a modulation order for subsequent communications using the associated subset of antenna elements, a precoding matrix indicator for subsequent communications using the associated subset of antenna elements, a rank indicator for subsequent communications using the associated subset of antenna elements, or any combinations thereof.

The codebook manager 1130 may manage codebooks of beamforming weights for different transmission beams. In some cases, each of the first sounding signal and the second sounding signal have different first communication node antenna elements muted. In some cases, the beamforming weights of each unmuted antenna element used for transmitting the first sounding signal or the second sounding signal is unchanged from the beamforming weights of the first transmit beam. In some cases, the beamforming weights of one or more unmuted antenna elements used for transmitting the first sounding signal or the second sounding signal is power boosted or scaled relative to the beamforming weights of the first transmit beam.

The configuration manager 1135 may configure the first communication node to transmit the first sounding signal and the second sounding signal using the different subsets of first communication node antenna elements. In some examples, the configuration manager 1135 may receive, from the first communication node, a capability indication that the first communication node is capable of transmitting using the different subsets of first communication node antenna elements, and where the configuring is performed responsive to receiving the capability indication.

Figure 12:
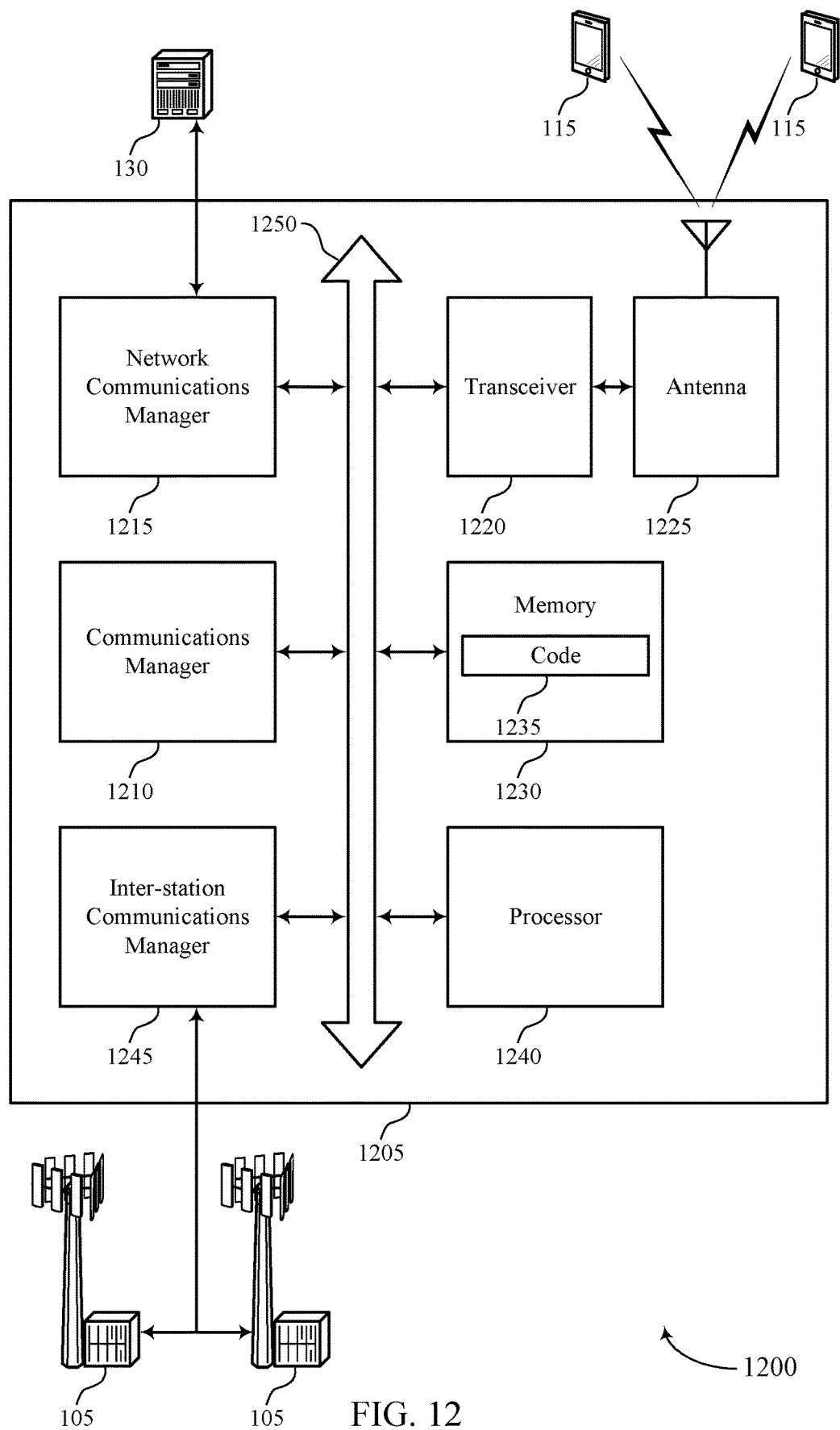
FIG. 12 shows a diagram of a system including a device that supports channel sounding techniques with analog beamforming in accordance with aspects of the present disclosure.

FIG. 12 shows a diagram of a system 1200 including a device 1205 that supports channel sounding techniques with analog beamforming in accordance with aspects of the present disclosure. The device 1205 may be an example of or include the components of device 905, device 1005, a base station 105, a first communication node, or a second communication node, as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may determine, when the device 1205 is acting as a second communication node, a first receive beam for use in receiving communications from a first communication node via a first transmit beam of the first communication node, where the first receive beam has an associated first set of beamforming weights that are applied to each antenna element of a set of second communication node antenna elements, and where the first transmit beam of the first communication node is transmitted via a set of first communication node antenna elements, communicate with the first communication node using the first set of beamforming weights of the first receive beam, measure a first sounding signal received from the first communication node using the first set of beamforming weights of the first receive beam, measure a second sounding signal received from the first communication node using the first set of beamforming weights of the first receive beam, where the first communication node uses different subsets of first communication node antenna elements for each of the first sounding signal and the second sounding signal, and transmit scheduling information to the first communication node for communications with the second communication node using one of the subsets of first communication node antenna elements.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting higher resolution of channel sounding with analog beamforming).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
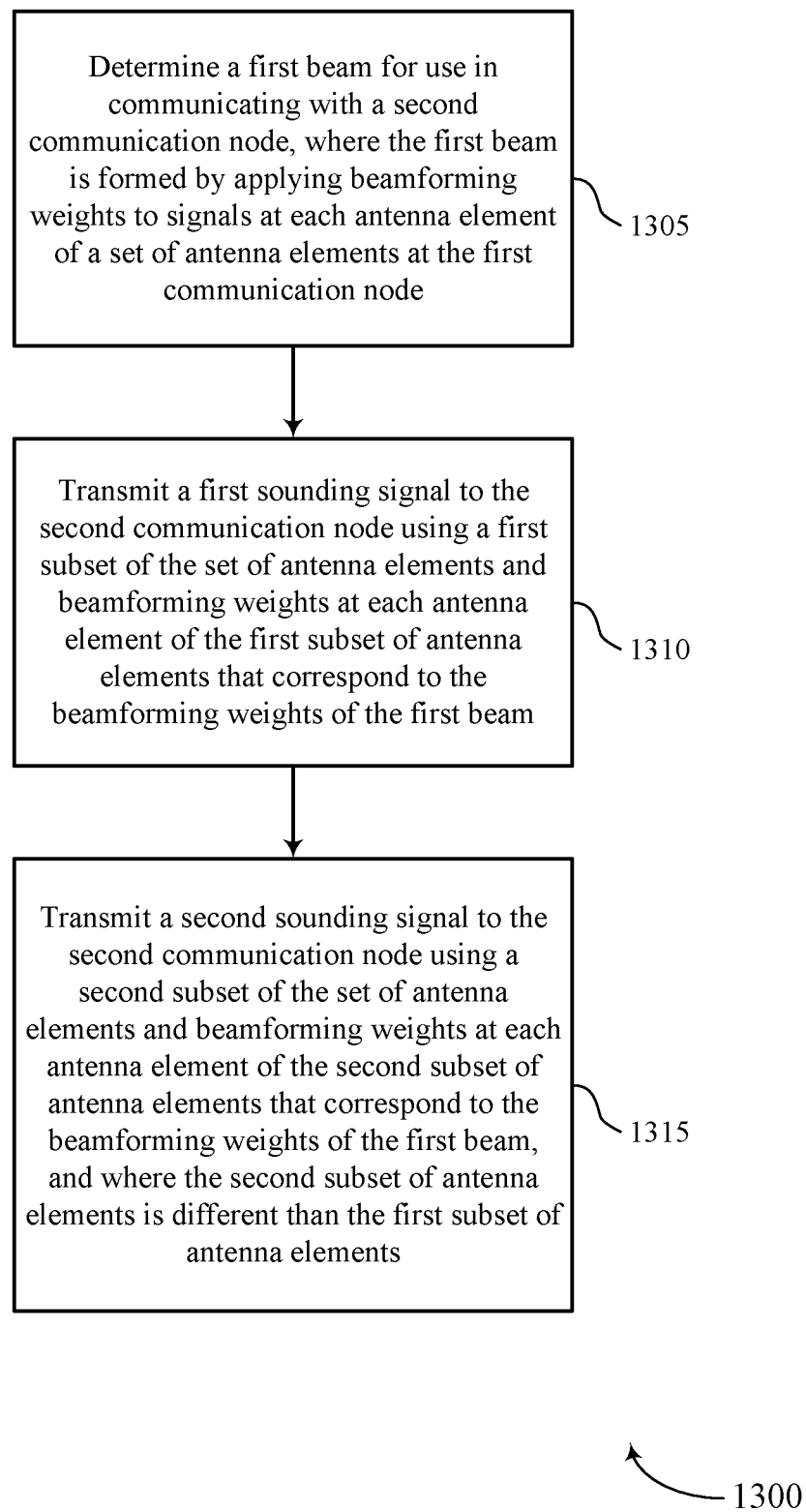
FIGS. 13 through 17 show flowcharts illustrating methods that support channel sounding techniques with analog beamforming in accordance with aspects of the present disclosure.

FIG. 13 shows a flowchart illustrating a method 1300 that supports channel sounding with analog beamforming in accordance with aspects of the present disclosure. The operations of method 1300 may be implemented by a first communication node, such as a UE 115 or base station 105, its components as described herein. For example, the operations of method 1300 may be performed by a communications manager as described with reference to FIGS. 5 through 8. In some examples, a first communication node may execute a set of instructions to control the functional elements of the first communication node to perform the functions described below. Additionally or alternatively, a first communication node may perform aspects of the functions described below using special-purpose hardware.

At 1305, the first communication node may determine a first beam for use in communicating with a second communication node, where the first beam is formed by applying beamforming weights to signals at each antenna element of a set of antenna elements at the first communication node. The operations of 1305 may be performed according to the methods described herein. In some examples, aspects of the operations of 1305 may be performed by a beam manager as described with reference to FIGS. 5 through 8.

At 1310, the first communication node may transmit a first sounding signal to the second communication node using a first subset of the set of antenna elements and beamforming weights at each antenna element of the first subset of antenna elements that correspond to the beamforming weights of the first beam. The operations of 1310 may be performed according to the methods described herein. In some examples, aspects of the operations of 1310 may be performed by a sounding signal manager as described with reference to FIGS. 5 through 8.

At 1315, the first communication node may transmit a second sounding signal to the second communication node using a second subset of the set of antenna elements and beamforming weights at each antenna element of the second subset of antenna elements that correspond to the beamforming weights of the first beam, and where the second subset of antenna elements is different than the first subset of antenna elements. The operations of 1315 may be performed according to the methods described herein. In some examples, aspects of the operations of 1315 may be performed by a sounding signal manager as described with reference to FIGS. 5 through 8.

Figure 14:
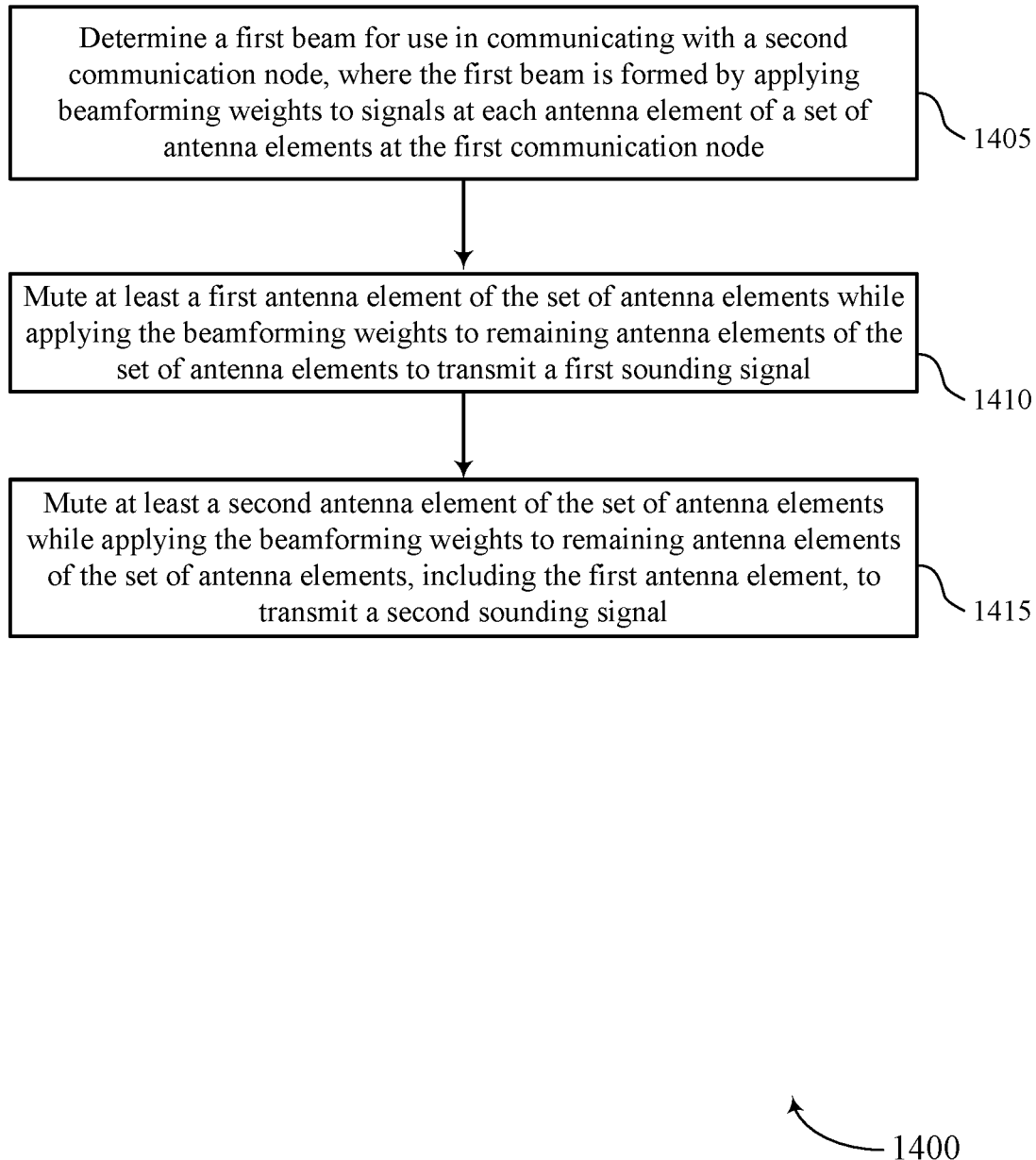

FIG. 14 shows a flowchart illustrating a method 1400 that supports channel sounding with analog beamforming in accordance with aspects of the present disclosure. The operations of method 1400 may be implemented by a first communication node, such as UE 115 or base station 105, or its components as described herein. For example, the operations of method 1400 may be performed by a communications manager as described with reference to FIGS. 5 through 8. In some examples, a first communication node may execute a set of instructions to control the functional elements of the first communication node to perform the functions described below. Additionally or alternatively, a first communication node may perform aspects of the functions described below using special-purpose hardware.

At 1405, the first communication node may determine a first beam for use in communicating with a second communication node, where the first beam is formed by applying beamforming weights to signals at each antenna element of a set of antenna elements at the first communication node. The operations of 1405 may be performed according to the methods described herein. In some examples, aspects of the operations of 1405 may be performed by a beam manager as described with reference to FIGS. 5 through 8.

At 1410, the first communication node may mute at least a first antenna element of the set of antenna elements while applying the beamforming weights to remaining antenna elements of the set of antenna elements to transmit the first sounding signal. The operations of 1410 may be performed according to the methods described herein. In some examples, aspects of the operations of 1410 may be performed by a sounding signal manager as described with reference to FIGS. 5 through 8.

At 1415, the first communication node may mute at least a second antenna element of the set of antenna elements while applying the beamforming weights to remaining antenna elements of the set of antenna elements, including the first antenna element, to transmit the second sounding signal. The operations of 1415 may be performed according to the methods described herein. In some examples, aspects of the operations of 1415 may be performed by a sounding signal manager as described with reference to FIGS. 5 through 8.

In some cases, the beamforming weights of each unmuted antenna element used for transmitting the first sounding signal or the second sounding signal is unchanged from the beamforming weights of the first beam. In other cases, the beamforming weights of one or more unmuted antenna elements used for transmitting the first sounding signal or the second sounding signal is power boosted or scaled relative to the beamforming weights of the first beam.

Figure 15:
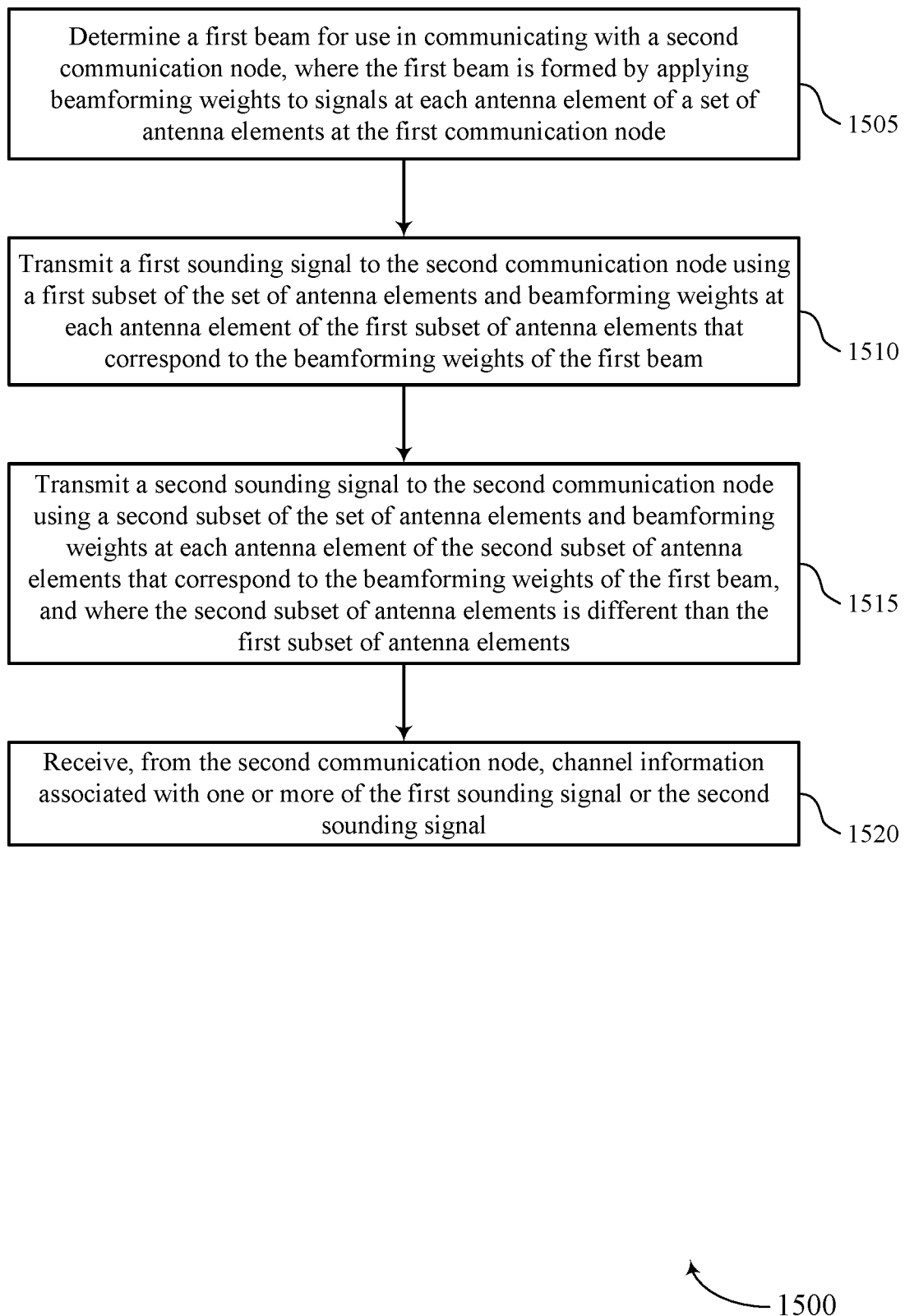

FIG. 15 shows a flowchart illustrating a method 1500 that supports channel sounding with analog beamforming in accordance with aspects of the present disclosure. The operations of method 1500 may be implemented by a first communication node, such as a UE 115 or base station 105, or its components as described herein. For example, the operations of method 1500 may be performed by a communications manager as described with reference to FIGS. 5 through 8. In some examples, a first communication node may execute a set of instructions to control the functional elements of the first communication node to perform the functions described below. Additionally or alternatively, a first communication node may perform aspects of the functions described below using special-purpose hardware.

At 1505, the first communication node may determine a first beam for use in communicating with a second communication node, where the first beam is formed by applying beamforming weights to signals at each antenna element of a set of antenna elements at the first communication node. The operations of 1505 may be performed according to the methods described herein. In some examples, aspects of the operations of 1505 may be performed by a beam manager as described with reference to FIGS. 5 through 8.

At 1510, the first communication node may transmit a first sounding signal to the second communication node using a first subset of the set of antenna elements and beamforming weights at each antenna element of the first subset of antenna elements that correspond to the beamforming weights of the first beam. The operations of 1510 may be performed according to the methods described herein. In some examples, aspects of the operations of 1510 may be performed by a sounding signal manager as described with reference to FIGS. 5 through 8.

At 1515, the first communication node may transmit a second sounding signal to the second communication node using a second subset of the set of antenna elements and beamforming weights at each antenna element of the second subset of antenna elements that correspond to the beamforming weights of the first beam, and where the second subset of antenna elements is different than the first subset of antenna elements. The operations of 1515 may be performed according to the methods described herein. In some examples, aspects of the operations of 1515 may be performed by a sounding signal manager as described with reference to FIGS. 5 through 8.

At 1520, the first communication node may receive, from the second communication node, channel information associated with one or more of the first sounding signal or the second sounding signal. The operations of 1520 may be performed according to the methods described herein. In some examples, aspects of the operations of 1520 may be performed by a channel information manager as described with reference to FIGS. 5 through 8. In some cases, the channel information includes one or more of a beam and antenna subset index, a channel impulse response, beam angle information, beam delay spread information, a modulation order for subsequent communications using the associated subset of antenna elements, a precoding matrix indicator for subsequent communications using the associated subset of antenna elements, a rank indicator for subsequent communications using the associated subset of antenna elements, or any combinations thereof.

Figure 16:
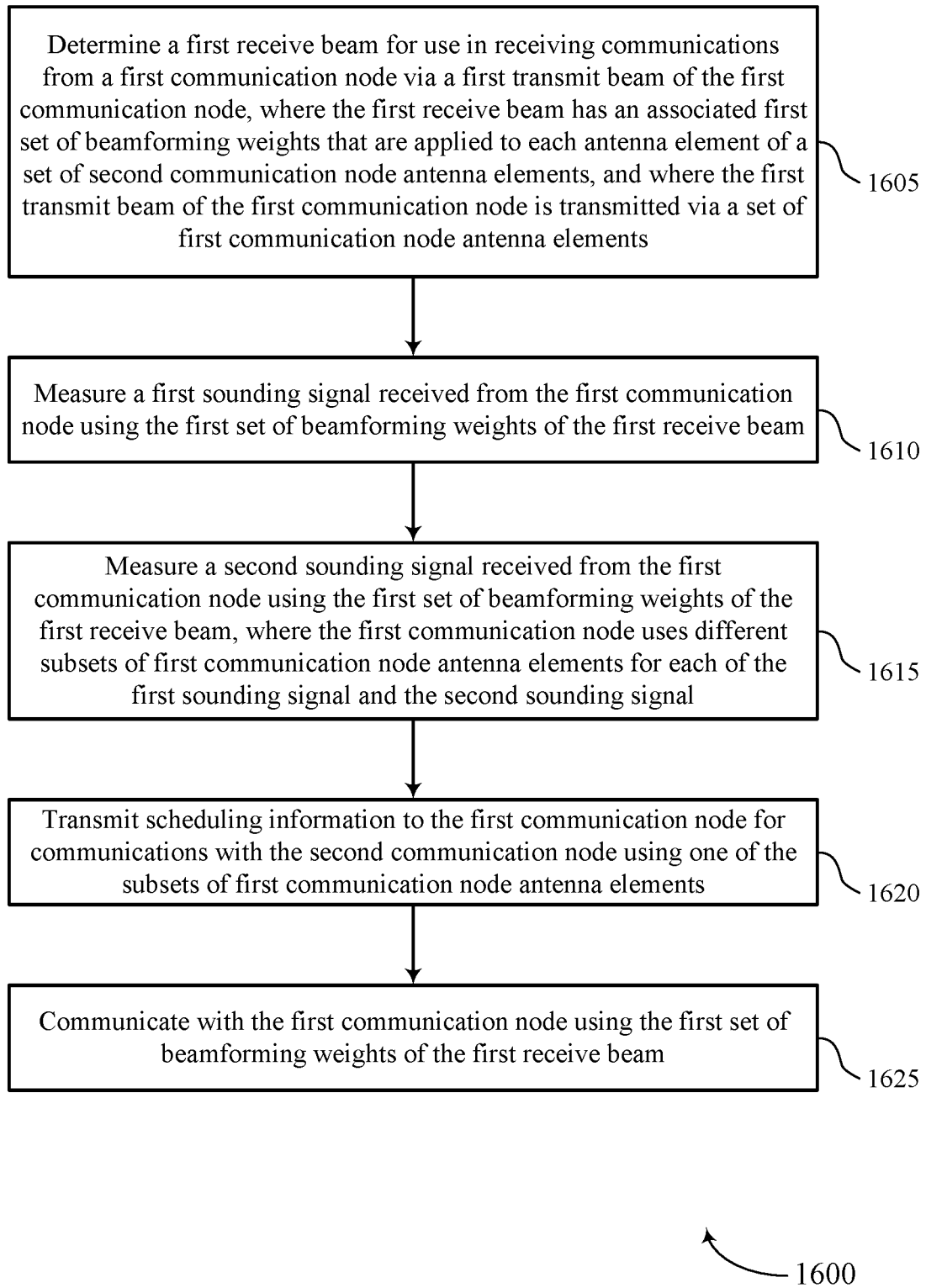

FIG. 16 shows a flowchart illustrating a method 1600 that supports channel sounding with analog beamforming in accordance with aspects of the present disclosure. The operations of method 1600 may be implemented by a second communication node, such as a UE 115 or base station 105, or its components as described herein. For example, the operations of method 1600 may be performed by a communications manager as described with reference to FIGS. 9 through 12. In some examples, a second communication node may execute a set of instructions to control the functional elements of the second communication node to perform the functions described below. Additionally or alternatively, a second communication node may perform aspects of the functions described below using special-purpose hardware.

At 1605, the second communication node may determine a first receive beam for use in receiving communications from a first communication node via a first transmit beam of the first communication node, where the first receive beam has an associated first set of beamforming weights that are applied to each antenna element of a set of second communication node antenna elements, and where the first transmit beam of the first communication node is transmitted via a set of first communication node antenna elements. The operations of 1605 may be performed according to the methods described herein. In some examples, aspects of the operations of 1605 may be performed by a beam manager as described with reference to FIGS. 9 through 12.

At 1610, the second communication node may measure a first sounding signal received from the first communication node using the first set of beamforming weights of the first receive beam. The operations of 1610 may be performed according to the methods described herein. In some examples, aspects of the operations of 1610 may be performed by a sounding signal manager as described with reference to FIGS. 9 through 12.

At 1615, the second communication node may measure a second sounding signal received from the first communication node using the first set of beamforming weights of the first receive beam, where the first communication node uses different subsets of first communication node antenna elements for each of the first sounding signal and the second sounding signal. The operations of 1615 may be performed according to the methods described herein. In some examples, aspects of the operations of 1615 may be performed by a sounding signal manager as described with reference to FIGS. 9 through 12.

At 1620, the second communication node may transmit scheduling information to the first communication node for communications with the second communication node using one of the subsets of first communication node antenna elements. The operations of 1620 may be performed according to the methods described herein. In some examples, aspects of the operations of 1620 may be performed by a scheduling manager as described with reference to FIGS. 9 through 12.

At 1625, the second communication node may communicate with the first communication node using the first set of beamforming weights of the first receive beam. The operations of 1625 may be performed according to the methods described herein. In some examples, aspects of the operations of 1625 may be performed by a beam manager as described with reference to FIGS. 9 through 12.

Figure 17:
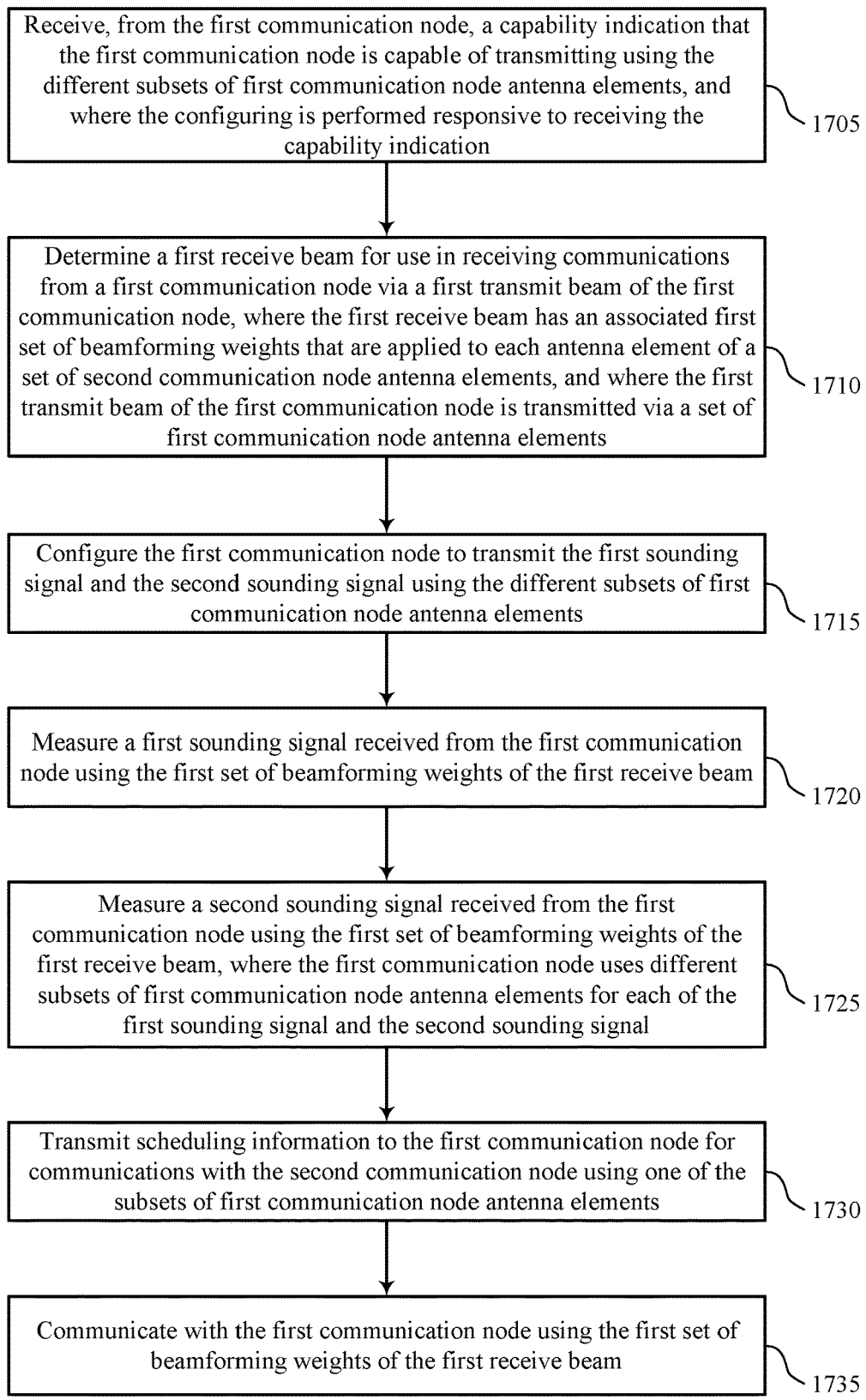

FIG. 17 shows a flowchart illustrating a method 1700 that supports channel sounding with analog beamforming in accordance with aspects of the present disclosure. The operations of method 1700 may be implemented by a second communication node, such as a UE 115 or base station 105, or its components as described herein. For example, the operations of method 1700 may be performed by a communications manager as described with reference to FIGS. 9 through 12. In some examples, a second communication node may execute a set of instructions to control the functional elements of the second communication node to perform the functions described below. Additionally or alternatively, a second communication node may perform aspects of the functions described below using special-purpose hardware.

At 1705, the second communication node may receive, from the first communication node, a capability indication that the first communication node is capable of transmitting using the different subsets of first communication node antenna elements, and where the configuring is performed responsive to receiving the capability indication. The operations of 1705 may be performed according to the methods described herein. In some examples, aspects of the operations of 1705 may be performed by a configuration manager as described with reference to FIGS. 9 through 12.

At 1710, the second communication node may determine a first receive beam for use in receiving communications from a first communication node via a first transmit beam of the first communication node, where the first receive beam has an associated first set of beamforming weights that are applied to each antenna element of a set of second communication node antenna elements, and where the first transmit beam of the first communication node is transmitted via a set of first communication node antenna elements. The operations of 1710 may be performed according to the methods described herein. In some examples, aspects of the operations of 1710 may be performed by a beam manager as described with reference to FIGS. 9 through 12.

At 1715, the second communication node may configure the first communication node to transmit the first sounding signal and the second sounding signal using the different subsets of first communication node antenna elements. The operations of 1715 may be performed according to the methods described herein. In some examples, aspects of the operations of 1715 may be performed by a configuration manager as described with reference to FIGS. 9 through 12.

At 1720, the second communication node may measure a first sounding signal received from the first communication node using the first set of beamforming weights of the first receive beam. The operations of 1720 may be performed according to the methods described herein. In some examples, aspects of the operations of 1720 may be performed by a sounding signal manager as described with reference to FIGS. 9 through 12.

At 1725, the second communication node may measure a second sounding signal received from the first communication node using the first set of beamforming weights of the first receive beam, where the first communication node uses different subsets of first communication node antenna elements for each of the first sounding signal and the second sounding signal. The operations of 1725 may be performed according to the methods described herein. In some examples, aspects of the operations of 1725 may be performed by a sounding signal manager as described with reference to FIGS. 9 through 12.

At 1730, the second communication node may transmit scheduling information to the first communication node for communications with the second communication node using one of the subsets of first communication node antenna elements. The operations of 1730 may be performed according to the methods described herein. In some examples, aspects of the operations of 1730 may be performed by a scheduling manager as described with reference to FIGS. 9 through 12.

At 1735, the second communication node may communicate with the first communication node using the first set of beamforming weights of the first receive beam. The operations of 1735 may be performed according to the methods described herein. In some examples, aspects of the operations of 1735 may be performed by a beam manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication, comprising: determining, at a first communication node, a first beam for use in communicating with a second communication node, wherein the first beam is formed by applying beamforming weights to signals at each antenna element of a set of antenna elements at the first communication node; transmitting a first sounding signal to the second communication node using a first subset of the set of antenna elements and beamforming weights at each antenna element of the first subset of antenna elements that correspond to the beamforming weights of the first beam; and transmitting a second sounding signal to the second communication node using a second subset of the set of antenna elements and beamforming weights at each antenna element of the second subset of antenna elements that correspond to the beamforming weights of the first beam, and wherein the second subset of antenna elements is different than the first subset of antenna elements.

Aspect 2: The method of aspect 1, wherein the transmitting the first sounding signal comprises: muting at least a first antenna element of the set of antenna elements while applying the beamforming weights to remaining antenna elements of the set of antenna elements to transmit the first sounding signal.

Aspect 3: The method of aspect 2, wherein the transmitting the second sounding signal comprises: muting at least a second antenna element of the set of antenna elements while applying the beamforming weights to remaining antenna elements of the set of antenna elements, including the first antenna element, to transmit the second sounding signal.

Aspect 4: The method of aspect 3, wherein the beamforming weights of each unmuted antenna element used for transmitting the first sounding signal or the second sounding signal is unchanged from the beamforming weights of the first beam.

Aspect 5: The method of any of aspects 3 through 4, wherein the beamforming weights of one or more unmuted antenna elements used for transmitting the first sounding signal or the second sounding signal is power boosted or scaled relative to the beamforming weights of the first beam.

Aspect 6: The method of any of aspects 1 through 5, wherein one or more of the first subset of antenna elements or the second subset of antenna elements contains a single antenna element.

Aspect 7: The method of any of aspects 1 through 6, further comprising: transmitting a capability indication to the second communication node that indicates the first communication node is capable of supporting transmissions using different subsets of the set of antenna elements.

Aspect 8: The method of any of aspects 1 through 7, further comprising: receiving, from the second communication node, scheduling information for one or more transmissions to or from the second communication node that are to be transmitted or received using the first subset of antenna elements or the second subset of antenna elements, wherein the scheduling information is based at least in part on a channel state information measurement of the first sounding signal or the second sounding signal.

Aspect 9: The method of any of aspects 1 through 8, further comprising: receiving, from the second communication node, channel information associated with one or more of the first sounding signal or the second sounding signal.

Aspect 10: The method of aspect 9, wherein the channel information includes one or more of a beam and antenna subset index, a channel impulse response, beam angle information, beam delay spread information, a modulation order for subsequent communications using the associated subset of antenna elements, a precoding matrix indicator for subsequent communications using the associated subset of antenna elements, a rank indicator for subsequent communications using the associated subset of antenna elements, or any combinations thereof.

Aspect 11: The method of any of aspects 1 through 10, wherein the beamforming weights are analog beamforming weights, and each antenna element of the set of antenna elements is associated with a same digital processing chain at the first communication node.

Aspect 12: The method of any of aspects 1 through 11, wherein the determining the first beam comprises: measuring a plurality of reference signals transmitted by the second communication node using a plurality of different beams in a beam sweep procedure; and selecting the first beam based at least in part on the measuring.

Aspect 13: The method of aspect 12, further comprising: reporting the selected first beam to the second communication node.

Aspect 14: A method for wireless communication, comprising: determining, at a second communication node, a first receive beam for use in receiving communications from a first communication node via a first transmit beam of the first communication node, wherein the first receive beam has an associated first set of beamforming weights that are applied to each antenna element of a set of second communication node antenna elements, and wherein the first transmit beam of the first communication node is transmitted via a set of first communication node antenna elements; measuring a first sounding signal received from the first communication node using the first set of beamforming weights of the first receive beam; measuring a second sounding signal received from the first communication node using the first set of beamforming weights of the first receive beam, wherein the first communication node uses different subsets of first communication node antenna elements for each of the first sounding signal and the second sounding signal; transmitting scheduling information to the first communication node for communications with the second communication node using one of the subsets of first communication node antenna elements; and communicating with the first communication node using the first set of beamforming weights of the first receive beam.

Aspect 15: The method of aspect 14, further comprising: calculating a first channel state information measurement for the first sounding signal and a second channel state information measurement for the second sounding signal, and wherein the scheduling information is determined based at least in part on the first channel state information measurement or the second channel state information measurement.

Aspect 16: The method of any of aspects 14 through 15, wherein the beamforming weights of the different subsets of first communication node antenna elements used for transmitting the first sounding signal or the second sounding signal is unchanged from the beamforming weights of the first transmit beam.

Aspect 17: The method of any of aspects 14 through 16, wherein the beamforming weights of one or more antenna elements of the different subsets of first communication node antenna elements used for transmitting the first sounding signal or the second sounding signal is power boosted or scaled relative to the beamforming weights of the first transmit beam.

Aspect 18: The method of any of aspects 14 through 17, further comprising: configuring the first communication node to transmit the first sounding signal and the second sounding signal using the different subsets of first communication node antenna elements.

Aspect 19: The method of aspect 18, further comprising: receiving, from the first communication node, a capability indication that the first communication node is capable of transmitting using the different subsets of first communication node antenna elements, and wherein the configuring is performed responsive to receiving the capability indication.

Aspect 20: The method of any of aspects 14 through 19, further comprising: transmitting, to the first communication node, channel information associated with one or more of the first sounding signal or the second sounding signal.

Aspect 21: The method of aspect 20, wherein the channel information includes one or more of a beam and antenna subset index, a channel impulse response, beam angle information, beam delay spread information, a modulation order for subsequent communications using the associated subset of antenna elements, a precoding matrix indicator for subsequent communications using the associated subset of antenna elements, a rank indicator for subsequent communications using the associated subset of antenna elements, or any combinations thereof.

Aspect 22: The method of any of aspects 14 through 21, wherein the determining the first receive beam comprises: transmitting a plurality of reference signals to the first communication node using a plurality of different beams in a beam sweep procedure; receiving a measurement report from the first communication node that is based on measurements of one or more of the plurality of reference signals; and determining a transmit/receive beam pair that includes the first receive beam based at least in part on the measurement report.

Aspect 23: An apparatus for wireless communication, comprising a processor; memory coupled with the processor; and instructions stored in the memory and executable by the processor to cause the apparatus to perform a method of any of aspects 1 through 13.

Aspect 24: An apparatus for wireless communication, comprising at least one means for performing a method of any of aspects 1 through 13.

Aspect 25: A non-transitory computer-readable medium storing code for wireless communication, the code comprising instructions executable by a processor to perform a method of any of aspects 1 through 13.

Aspect 26: An apparatus for wireless communication, comprising a processor; memory coupled with the processor; and instructions stored in the memory and executable by the processor to cause the apparatus to perform a method of any of aspects 14 through 22.

Aspect 27: An apparatus for wireless communication, comprising at least one means for performing a method of any of aspects 14 through 22.

Aspect 28: A non-transitory computer-readable medium storing code for wireless communication, the code comprising instructions executable by a processor to perform a method of any of aspects 14 through 22.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   determining, at a first communication node, a first beam for use in communicating with a second communication node, wherein the first beam is formed by applying beamforming weights to signals at each antenna element of a set of antenna elements at the first communication node;
   transmitting a first sounding signal to the second communication node using a first subset of the set of antenna elements and beamforming weights at each antenna element of the first subset of antenna elements that correspond to the beamforming weights of the first beam, the transmitting comprising muting at least a first antenna element of the set of antenna elements while applying the beamforming weights to remaining antenna elements of the set of antenna elements to transmit the first sounding signal; and
   transmitting a second sounding signal to the second communication node using a second subset of the set of antenna elements and beamforming weights at each antenna element of the second subset of antenna elements that correspond to the beamforming weights of the first beam, and wherein the second subset of antenna elements is different than the first subset of antenna elements.

2. The method of claim 1, wherein the transmitting the second sounding signal comprises:
   muting at least a second antenna element of the set of antenna elements while applying the beamforming weights to remaining antenna elements of the set of antenna elements, including the first antenna element, to transmit the second sounding signal.

3. The method of claim 2, wherein the beamforming weights of each unmuted antenna element used for transmitting the first sounding signal or the second sounding signal is unchanged from the beamforming weights of the first beam.

4. The method of claim 2, wherein the beamforming weights of one or more unmuted antenna elements used for transmitting the first sounding signal or the second sounding signal is power boosted or scaled relative to the beamforming weights of the first beam.

5. The method of claim 1, wherein one or more of the first subset of antenna elements or the second subset of antenna elements contains a single antenna element.

6. The method of claim 1, further comprising:
   transmitting a capability indication to the second communication node that indicates the first communication node is capable of supporting transmissions using different subsets of the set of antenna elements.

7. The method of claim 1, further comprising:
   receiving, from the second communication node, scheduling information for one or more transmissions to or from the second communication node that are to be transmitted or received using the first subset of antenna elements or the second subset of antenna elements, wherein the scheduling information is based at least in part on a channel state information measurement of the first sounding signal or the second sounding signal.

8. The method of claim 1, further comprising:
   receiving, from the second communication node, channel information associated with one or more of the first sounding signal or the second sounding signal.

9. The method of claim 8, wherein the channel information includes one or more of a beam and antenna subset index, a channel impulse response, beam angle information, beam delay spread information, a modulation order for subsequent communications using the associated subset of antenna elements, a precoding matrix indicator for subsequent communications using the associated subset of antenna elements, a rank indicator for subsequent communications using the associated subset of antenna elements, or any combinations thereof.

10. The method of claim 1, wherein the beamforming weights are analog beamforming weights, and wherein each antenna element of the set of antenna elements is associated with a same digital processing chain at the first communication node.

11. The method of claim 1, wherein the determining the first beam comprises:
    measuring a plurality of reference signals transmitted by the second communication node using a plurality of different beams in a beam sweep procedure; and
    selecting the first beam based at least in part on the measuring.

12. The method of claim 11, further comprising:
    reporting the selected first beam to the second communication node.

13. A method for wireless communication, comprising:
    determining, at a second communication node, a first receive beam for use in receiving communications from a first communication node via a first transmit beam of the first communication node, wherein the first receive beam has an associated first set of beamforming weights that are applied to each antenna element of a set of second communication node antenna elements, and wherein the first transmit beam of the first communication node is transmitted via a set of first communication node antenna elements;
measuring a first sounding signal received from the first communication node using the first set of beamforming weights of the first receive beam;
measuring a second sounding signal received from the first communication node using the first set of beamforming weights of the first receive beam, wherein the first communication node uses different subsets of first communication node antenna elements for each of the first sounding signal and the second sounding signal;
transmitting scheduling information to the first communication node for communications with the second communication node using one of the subsets of first communication node antenna elements; and
communicating with the first communication node using the first set of beamforming weights of the first receive beam.

14. The method of claim 13, further comprising:
calculating a first channel state information measurement for the first sounding signal and a second channel state information measurement for the second sounding signal, and wherein the scheduling information is determined based at least in part on the first channel state information measurement or the second channel state information measurement.

15. The method of claim 13, wherein the beamforming weights of the different subsets of first communication node antenna elements used for transmitting the first sounding signal or the second sounding signal is unchanged from the beamforming weights of the first transmit beam.

16. The method of claim 13, wherein the beamforming weights of one or more antenna elements of the different subsets of first communication node antenna elements used for transmitting the first sounding signal or the second sounding signal is power boosted or scaled relative to the beamforming weights of the first transmit beam.

17. The method of claim 13, further comprising:
configuring the first communication node to transmit the first sounding signal and the second sounding signal using the different subsets of first communication node antenna elements.

18. The method of claim 17, further comprising:
receiving, from the first communication node, a capability indication that the first communication node is capable of transmitting using the different subsets of first communication node antenna elements, and wherein the configuring is performed responsive to receiving the capability indication.

19. The method of claim 13, further comprising:
transmitting, to the first communication node, channel information associated with one or more of the first sounding signal or the second sounding signal.

20. The method of claim 19, wherein the channel information includes one or more of a beam and antenna subset index, a channel impulse response, beam angle information, beam delay spread information, a modulation order for subsequent communications using the associated subset of antenna elements, a precoding matrix indicator for subsequent communications using the associated subset of antenna elements, a rank indicator for subsequent communications using the associated subset of antenna elements, or any combinations thereof.

21. The method of claim 13, wherein the determining the first receive beam comprises:
transmitting a plurality of reference signals to the first communication node using a plurality of different beams in a beam sweep procedure;
receiving a measurement report from the first communication node that is based on measurements of one or more of the plurality of reference signals; and
determining a transmit/receive beam pair that includes the first receive beam based at least in part on the measurement report.

22. An apparatus for wireless communication, comprising:
a processor,
memory coupled with the processor; and
instructions stored in the memory and executable by the processor to cause the apparatus to:
determine, at a first communication node, a first beam for use in communicating with a second communication node, wherein the first beam is formed by applying beamforming weights to signals at each antenna element of a set of antenna elements at the first communication node;
mute at least a first antenna element of the set of antenna elements while applying the beamforming weights to remaining antenna elements of the set of antenna elements to provide a first subset of the set of antenna elements;
transmit a first sounding signal to the second communication node using the first subset of the set of antenna elements and beamforming weights at each antenna element of the first subset of antenna elements that correspond to the beamforming weights of the first beam; and
transmit a second sounding signal to the second communication node using a second subset of the set of antenna elements and beamforming weights at each antenna element of the second subset of antenna elements that correspond to the beamforming weights of the first beam, and wherein the second subset of antenna elements is different than the first subset of antenna elements.

23. The apparatus of claim 22, wherein the instructions are further executable by the processor to cause the apparatus to:
mute at least a second antenna element of the set of antenna elements while applying the beamforming weights to remaining antenna elements of the set of antenna elements, including the first antenna element, to transmit the first sounding signal.

24. The apparatus of claim 23, wherein the beamforming weights of each unmuted antenna element used for transmitting the first sounding signal or the second sounding signal is unchanged from the beamforming weights of the first beam.

25. The apparatus of claim 23, wherein the beamforming weights of one or more unmuted antenna elements used for transmitting the first sounding signal or the second sounding signal is power boosted or scaled relative to the beamforming weights of the first beam.

26. An apparatus for wireless communication, comprising:
a processor,
memory coupled with the processor; and
instructions stored in the memory and executable by the processor to cause the apparatus to:

determine, at a second communication node, a first receive beam for use in receiving communications from a first communication node via a first transmit beam of the first communication node, wherein the first receive beam has an associated first set of beamforming weights that are applied to each antenna element of a set of second communication node antenna elements, and wherein the first transmit beam of the first communication node is transmitted via a set of first communication node antenna elements;

measure a first sounding signal received from the first communication node using the first set of beamforming weights of the first receive beam;

measure a second sounding signal received from the first communication node using the first set of beamforming weights of the first receive beam, wherein the first communication node uses different subsets of first communication node antenna elements for each of the first sounding signal and the second sounding signal;

transmit scheduling information to the first communication node for communications with the second communication node using one of the subsets of first communication node antenna elements; and communicate with the first communication node using the first set of beamforming weights of the first receive beam.

27. The apparatus of claim 26, wherein the instructions are further executable by the processor to cause the apparatus to:

calculate a first channel state information measurement for the first sounding signal and a second channel state information measurement for the second sounding signal, and wherein the scheduling information is determined based at least in part on the first channel state information measurement or the second channel state information measurement.

28. The apparatus of claim 26, wherein the instructions are further executable by the processor to cause the apparatus to:

configure the first communication node to transmit the first sounding signal and the second sounding signal using the different subsets of first communication node antenna elements, based at least in part on a capability indication that the first communication node is capable of transmitting using the different subsets of first communication node antenna elements.

* * * * *